United States Patent
Scheutz et al.

(10) Patent No.: US 11,645,444 B2
(45) Date of Patent: May 9, 2023

(54) SYSTEMS AND METHODS ENABLING ONLINE ONE-SHOT LEARNING AND GENERALIZATION BY INTELLIGENT SYSTEMS OF TASK-RELEVANT FEATURES AND TRANSFER TO A COHORT OF INTELLIGENT SYSTEMS

(71) Applicant: Trustees of Tufts College, Medford, MA (US)

(72) Inventors: Matthias J. Scheutz, Boston, MA (US); Evan A. Krause, Somerville, MA (US)

(73) Assignee: Trustees of Tufts College, Medford, MA (US)

( * ) Notice: Subject to any disclaimer, the term of this patent is extended or adjusted under 35 U.S.C. 154(b) by 259 days.

(21) Appl. No.: 16/098,785

(22) PCT Filed: May 10, 2017

(86) PCT No.: PCT/US2017/032010
§ 371 (c)(1),
(2) Date: Nov. 2, 2018

(87) PCT Pub. No.: WO2017/197018
PCT Pub. Date: Nov. 16, 2017

(65) Prior Publication Data
US 2019/0378019 A1     Dec. 12, 2019

Related U.S. Application Data

(60) Provisional application No. 62/334,171, filed on May 10, 2016.

(51) Int. Cl.
*G06F 40/00*       (2020.01)
*G06N 5/02*        (2023.01)
(Continued)

(52) U.S. Cl.
CPC .......... *G06F 40/00* (2020.01); *G06F 16/3344* (2019.01); *G06F 16/90332* (2019.01);
(Continued)

(58) Field of Classification Search
CPC .......... G06N 5/02; G06N 3/006; G06N 20/00; G06F 16/90335; G06F 40/00;
(Continued)

(56) References Cited

U.S. PATENT DOCUMENTS 6,427,142 B1 *  7/2002  Zachary .................... G06F 8/34
                                                                706/11
6,836,701 B2    12/2004  McKee
(Continued)

FOREIGN PATENT DOCUMENTS

WO    WO-2014-124273 A1    8/2014

OTHER PUBLICATIONS

Chen et al., "Toward Open Knowledge Enabling for Human-Robot Interaction", Jan. 28, 2013, Journal of Human-Robot Interaction, vol. 1, Issue 2, pp. 100-117. (Year: 2013).*
(Continued)

*Primary Examiner* — Miranda M Huang
*Assistant Examiner* — Chase P. Hinckley
(74) *Attorney, Agent, or Firm* — Occhiuti & Rohlicek LLP

(57) ABSTRACT

An intelligent system, such as an autonomous robot agent, includes systems and methods to learn various aspects about a task in response to instructions received from a human instructor, to apply the instructed knowledge immediately during task performance following the instruction, and to instruct other intelligent systems about the knowledge for performing the task. The learning is accomplished free of training the intelligent system. The instructions from the human instructor may be provided in a natural language
(Continued)

format and may include deictic references. The instructions may be received while the intelligent system is online, and may be provided to the intelligent system in one shot, e.g., in a single encounter or transaction with the human instructor.

22 Claims, 11 Drawing Sheets

(51) Int. Cl.
*G10L 15/18* (2013.01)
*G06F 16/33* (2019.01)
*G06F 16/9032* (2019.01)
*G06F 16/903* (2019.01)

(52) U.S. Cl.
CPC ............ *G06N 5/02* (2013.01); *G10L 15/18* (2013.01); *G05B 2219/40153* (2013.01); *G06F 16/90335* (2019.01)

(58) Field of Classification Search
CPC .......... G06F 16/3344; G06F 16/90332; G10L 15/18; G05B 2219/40153
USPC ....................................................... 706/46
See application file for complete search history.

(56) References Cited

U.S. PATENT DOCUMENTS

| | | | |
|---|---|---|---|
| 8,073,564 B2 | 12/2011 | Bruemmer et al. | |
| 8,112,176 B2 | 2/2012 | Solomon | |
| 8,260,460 B2 | 9/2012 | Sanders et al. | |
| 8,346,563 B1* | 1/2013 | Hjelm | G10L 15/1822 379/88.01 |
| 8,443,350 B2* | 5/2013 | Gehrke | A63F 13/10 717/149 |
| 8,483,930 B2 | 7/2013 | Kawaguchi et al. | |
| 8,639,644 B1 | 1/2014 | Hickman et al. | |
| 8,644,990 B2 | 2/2014 | Kim et al. | |
| 9,098,913 B2* | 8/2015 | Jiang | G06T 7/40 |
| 9,495,648 B1* | 11/2016 | Boyer | G06F 16/3329 |
| 10,065,316 B2* | 9/2018 | Sussman | B25J 19/06 |
| 10,325,212 B1* | 6/2019 | Paliwal | G06N 20/00 |
| 10,350,757 B2* | 7/2019 | Erhart | B25J 9/1679 |
| 10,621,499 B1* | 4/2020 | Khamis | G06F 16/355 |
| 2003/0028498 A1* | 2/2003 | Hayes-Roth | G06N 20/00 706/17 |
| 2008/0243305 A1 | 10/2008 | Lee et al. | |
| 2008/0256008 A1 | 10/2008 | Kwok | |
| 2009/0157401 A1* | 6/2009 | Bennett | G06F 17/27 704/243 |
| 2011/0225204 A1 | 9/2011 | Liguori | |
| 2011/0276944 A1 | 11/2011 | Bergman et al. | |
| 2011/0320187 A1* | 12/2011 | Motik | G06F 17/278 704/9 |
| 2012/0136481 A1* | 5/2012 | Maisonnier | B25J 9/1661 700/257 |
| 2013/0080360 A1* | 3/2013 | Sterritt | G05B 13/02 706/14 |
| 2013/0151442 A1 | 6/2013 | Suh et al. | |
| 2013/0218339 A1* | 8/2013 | Maisonnier | B25J 11/0005 700/257 |
| 2013/0268260 A1* | 10/2013 | Lundberg | G06F 17/28 704/8 |
| 2014/0163730 A1* | 6/2014 | Mian | B25J 9/16 700/248 |
| 2014/0249676 A1 | 9/2014 | Florencio et al. | |
| 2014/0297268 A1* | 10/2014 | Govrin | G06Q 40/02 704/9 |
| 2015/0032443 A1* | 1/2015 | Karov | G06F 40/284 704/9 |
| 2015/0100157 A1 | 4/2015 | Houssin et al. | |
| 2015/0106308 A1* | 4/2015 | Harrison | G06N 5/043 706/12 |
| 2015/0142447 A1* | 5/2015 | Kennewick | G10L 15/285 704/275 |
| 2015/0142704 A1* | 5/2015 | London | G06F 40/58 706/11 |
| 2015/0186504 A1* | 7/2015 | Gorman | G06F 40/30 707/752 |
| 2015/0227508 A1* | 8/2015 | Howald | G06F 17/2881 704/9 |
| 2015/0336264 A1 | 11/2015 | Berger et al. | |
| 2015/0339376 A1* | 11/2015 | Wieweg | G06F 16/3329 707/739 |
| 2015/0348551 A1* | 12/2015 | Gruber | H04M 3/4936 704/235 |
| 2016/0026631 A1* | 1/2016 | Salam | H04L 41/16 707/694 |
| 2016/0199977 A1 | 7/2016 | Breazeal | |
| 2016/0203418 A1 | 7/2016 | Comerford et al. | |
| 2016/0318187 A1* | 11/2016 | Tan | B25J 9/1697 |
| 2016/0342702 A1* | 11/2016 | Barve | G06F 16/84 |
| 2017/0109655 A1* | 4/2017 | Miyazaki | G06N 5/02 |
| 2017/0125008 A1* | 5/2017 | Maisonnier | B25J 11/003 |
| 2017/0144304 A1* | 5/2017 | Guerin | B25J 9/1664 |
| 2018/0319015 A1* | 11/2018 | Sinyavskiy | B25J 9/0081 |

OTHER PUBLICATIONS

Mohan, Shiwali "From Verbs to Tasks: An Integrated Account of Learning Tasks from Situated Interactive Instruction" 2015 University of Michigan, pp. 1-169. (Year: 2015).*

Krause et al., "Learning to Recognize Novel Objects in One Shot through Human-Robot Interactions in Natural Language Dialogues" 2014 Proceedings of the Twenty-Eighth AAAI Conference on Artificial Intelligence, pp. 2796-2802. (Year: 2014).*

Subagdja et al., "Interactive Teachable Cognitive Agents: Smart Building Blocks for Multiagent Systems" Mar. 15, 2016, IEEE Transactions on Systems, Man, and Cybernetics: Systems, pp. 1-12. (Year: 2016).*

Ovchinnikova et al., "Multi-Purpose Natural Language Understanding Linked to Sensorimotor Experience in Humanoid Robots" Nov. 3-5, 2015, IEEE-RAS 15th International Conference on Humanoid Robots (Humanoids), pp. 365-372. (Year: 2015).*

Serban et al., "Building End-to-End Dialogue Systems Using Generative Hierarchical Neural Network Models" Apr. 6, 2016. (Year: 2016).*

Walter et al., "Learning Semantic Maps from Natural Language Descriptions" Jun. 24-28, 2013, Proceedings of the 2013 Robotics: Science and Systems IX Conference. (Year: 2013).*

Mericli et al., "An Interactive Approach for Situated Task Specification through Verbal Instructions" May 5-9, 2014, Proceedings of the 13th International Conference on Autonomous Agents and Multiagent Systems, pp. 1069-1076. (Year: 2014).*

She et al., "Teaching Robots New Actions through Natural Language Instructions" Aug. 25-29, 2014, 23rd IEEE International Symposium on Robot and Human Interactive Communication, pp. 868-873. (Year: 2014).*

Brooks et al., "Situation Understanding Bot Through Language and Environment" Mar. 5-8, 2012. (Year: 2012).*

Thomason et al., "Learning to Interpret Natural Language Commands through Human-Robot Dialog" 2015, Proceedings of the Twenty-Fourth International Joint Conference on Artificial Intelligence, pp. 1923-1929. (Year: 2015).*

Salem et al., "New Frontiers in Human-Robot Interactions" Apr. 21-22, 2015. (Year: 2015).*

Knepper et al., "Recovering from failure by asking for help" 2015, Autonomous Robot, vol. 39, pp. 347-362. (Year: 2015).*

Knepper et al., "Asking for Help Using Inverse Semantics" Jul. 12, 2014, Robotics: Science and Systems X. (Year: 2014).*

Bohus et al., "Directions Robot: In-the-Wild Experiences and Lessons Learned" May 5-9, 2014, Proceedings of the 13th International Conference on Autonomous Agents and Multiagent Systems, pp. 637-644. (Year: 2014).*

(56) References Cited

OTHER PUBLICATIONS

Cantrell et al., "Learning Actions from Human-Robot Interactions" Jul. 31-Aug. 3, 2011, 20th International Symposium on Robot and Human Interactive Communication, pp. 125-130. (Year: 2011).*
Sorenson et al., "A Context-Aware Middleware for Applications in Mobile Ad Hoc Environments" 2004 Middleware Companion, pp. 107-110. (Year: 2004).*
Loke et al., "Representing and Reasoning with the Internet of Things: A Modular Rule-Based Model for Ensembles of Context-Aware Smart Things" Mar. 9, 2016. (Year: 2016).*
Haber et al., "A Cognitive Architecture for Autonomous Robots" Dec. 2013, Advances in Cognitive Systems 2, pp. 257-275. (Year: 2013).*
Fischinger et al., "Hobbit, a care robot supporting independent living at home: First prototype and lessons learned", Oct. 7, 2014, Robotics and Autonomous Systems, vol. 75, pp. 60-78. (Year: 2014).*
Breuer et al., "Johnny: An Autonomous Service Robot for Domestic Environments" 2012, Journal of Intelligent Robot Systems, vol. 66, pp. 245-272. (Year: 2012).*
Belpaeme et al., "Multimodal Child-Robot Interaction: Building Social Bonds" 2012, Journal of Human-Robot Interaction, vol. 1, No. 2 , pp. 33-53. (Year: 2012).*
Aly et al., "Towards an intelligent system for generating an adapted verbal and nonverbal combined behavior in human-robot interaction" Jul. 4, 2015, Autonomous Robot, vol. 40, pp. 193-209. (Year: 2015).*
Mostafazadeh et al., "A Corpus and Cloze Evaluation for Deeper Understanding of Commonsense Stories" Apr. 6, 2016. (Year: 2016 ).*
Gillespie et al., "Goal Reasoning for an Autonomous Squad Member" May 2015, Annual Conference on Advances in Cognitive Systems: Workshop on Goal Reasoning. (Year: 2015).*
Deits et al., "Clarifying Commands with Information-Theoretic Human-Robot Dialog" 2012, Journal of Human-Robot Interaction, vol. 1, No. 1, pp. 78-95. (Year: 2012).*
Begoli et al., "Procedural Reasoning System (PRS) Architecture for Agent-mediated Behavioral Interventions" Mar. 13-16, 2014, IEEE SoutheastCon. (Year: 2014).*
Zhang et al., "A Two-Arm Situated Artificial Communicator for Human-Robot Cooperative Assembly" Aug. 2003, IEEE Transactions on Industrial Electronics, vol. 50, No. 4, pp. 651-658. (Year: 2003).*
Swigger et al., "S-TRAINER: Script Based Reasoning for Mission Assessment" Sep./Oct. 1991, IEEE Transactions on Systems, Man, and Cybernetics, vol. 21, No. 5, pp. 1243-1251. (Year: 1991).*
Ramirez-Amaro et al., "Understanding the Intention of Human Activities through Semantic Perception: Observation, Understanding and Execution on a Humanoid Robot" Mar. 2015, pp. 1-23. (Year: 2015).*
Beetz et al., "Cognition-Enabled Autonomous Robot Control for the Realization of Home Chore Task Intelligence" Jul. 13, 2012, Proceedings of the IEEE, vol. 100, No. 8, pp. 2454-2471. (Year: 2012).*
Cantrell et al., "Tell me when and why to do it!" Mar. 5-8, 2012, pp. 471-478. (Year: 2012).*
Misra et al., "Tell Me Dave: Context-sensitive grounding of natural language to manipulation instructions" Jan. 1, 2016, International Journal of Robotics Research, vol. 35 (1-3), pp. 281-300. (Year: 2016).*
Jain et al., "Learning Preferences for Manipulation Tasks from Online Coactive Feedback" Jan. 5, 2016, pp. 1-16. (Year: 2016).*
Tellex et al., "Asking for Help Using Inverse Semantics" Jul. 12, 2014, pp. 1-8. (Year: 2014).*
Zhang et al., "A Formal Analysis of Required Cooperation in Multi-agent Planning" Apr. 22, 2014, pp. 1-8. (Year: 2014).*
Niekum et al., "Learning grounded finite-state representations from unstructured demonstrations" Feb. 2015, International Journal of Robotics Research, vol. 34 (2), pp. 131-157. (Year: 2015).*
Broad et al., "Towards Real-Time Natural Language Corrections for Assistive Robots" 2016. (Year: 2016).*
Oh et al., "Toward Mobile Robots Reasoning Like Humans" Feb. 16, 2015. (Year: 2015).*
Thomason et al., "Learning to Interpret through Natural Language Commands through Human-Robot Dialog" Jun. 24, 2015, pp. 1923-1929. (Year: 2015).*
Canal et al., "Areal-time Human-Robot Interaction system based on gestures for assistive scenarios" Mar. 10, 2016, pp. 65-77. (Year: 2016).*
Matuszek et al., "Learning from Unscripted Deictic Gesture and Language for Human-Robot Interactions" Jun. 21, 2014, pp. 2556-2563. (Year: 2014).*
Fu et al., "One-Shot Learning of Manipulation Skills with Online Dynamics Adaptation and Neural Network Priors" Sep. 23, 2015. (Year: 2015).*
Kopicki et al., "One-Shot learning and generation of dexterous grasps for novel objects" 2016, pp. 959-976. (Year: 2016).*
Wang et al., "Relational Knowledge Transfer for Zero-Shot Learning" Mar. 2, 2016, pp. 2145-2151. (Year: 2016).*
Saxena et al., "RoboBrain: Large-Scale Knowledge Engine for Robots" Apr. 12, 2015. (Year: 2015).*
Haber, Adam Leigh, "A system architecture for learning robots" Oct. 2014, Thesis at UNSW Australia, pp. i-256. (Year: 2014).*
Chung et al., "On the performance of Hierarchical Distributed Correspondence Graphs for Efficient Symbol Grounding of Robot Instructions" 2015, pp. 5247-5252. (Year: 2015).*
Bastianelli et al., "Speaky for robots: the development of vocal interfaces for robotic applications" Jul. 23, 2015, pp. 43-66. (Year: 2015).*
Liu et al., "Generating machine-executable plans from end-user's natural-language instructions" 2016. (Year: 2016).*
Paul et al., "Efficient Grounding of Abstract Spatial Concepts for Natural Language Interaction with Robot Manipulators" 2016. (Year: 2016).*
Andronache, Vigil, et la., "ADE—An Architecture Development Environment for Virtual and Robotic Agents," World Scientific Publishing Co. Pte. Ltd., International Journal on artificial Intelligence Tools: Architectures, Languages, Algorithms, vol. 15, Issue 2, Apr. 2006, pp. 1-32.
Cantrell, Rehj, et al., "Learning Actions from Human-Robot Dialogues," IEEE, Proceedings of the 2011 RO-MAN $20^{th}$ IEEE International Symposium on Robot and Human Interactive Communication, Jul. 31-Aug. 3, 2011, pp. 125-130.
Dficzak, Juraj , et al., "What to do and how to do it: Translating Natural Language Directives into Temporal and Dynamic Logic Representation for Goal Management and Action Execution," IEEE, Proceedings of the 2009 IEEE International Conference on Robotics and Automation, May 12-17, 2009, pp. 1-6.
Iñigo-Blasco, Pablo, et al., "Robotics Software Frameworks for Multi-Agent Robotic Systems Development," Elsevier B.V., Robotics and Autonomous Systems, 60, Feb. 13, 2012, pp. 803-821.
Kramer, James et al., "Development Environments for Autonomous Mobile Robots: A Survey," Springer Science+Business Media, LLC, Autonomous Robots, vol. 22, Issue 2, Dec. 1, 2006, pp. 1-36.
Krause, Evan, et al., "Learning to Recognize Novel Objects in One Shot Through Human-Robot Interactions in Natural Language Dialogues," Association for the Advancement of Artificial Intelligence, Proceedings of the Twenty-Eighth AAAI Conference on Artificial Intelligence, Quebec City, Quebec, Canada, Jul. 27-31, 2014, pp. 2796-2802.
Ng, V., "Supervised Noun Phrase Coreference Research: The First Fifteen Years", ACM, Inc., Proceedings of the ACL '10 Proceedings of the $48^{th}$ Annual Meeting of the Association for Computational Linguistics, Uppsala, Sweden, Jul. 11-16, 2010, pp. 1396-1411.
"Notification of Transmittal of the International Search Report and the Written Opinion of the International Searching Authority, or the Declaration," International Filing Date: May 10, 2017, International Application No. PCT/US2017/032010, Applicant: Trustees of Tufts College, dated Jul. 24, 2017, pp. 1-8.
Schermerhorn, P., et al., "DIARC: A Testbed for Natural Human-Robot Interaction," American Association for artificial Intelligence, Conference Proceedings in the Twenty-First National Conference

(56) References Cited

OTHER PUBLICATIONS on Artificial Intelligence and the Eighteenth Innovative Applications of Artificial Intelligence Conference, Boston, Massachusetts, USA , Jul. 16-20, 2006, pp. 1-8.

Scheutz, Matthias, "ADE—Steps Towards a Distributed Development and Runtime Environment for Complex Robotic Agent Architectures," Taylor & Francis Online, Applied Artificial Intelligence: An International Journal, vol. 20, Issue 2-4, Feb. 2, 2007, pp. 1-33.

Scheutz, Matthias, "'Teach One, Teach All'—The Explosive Combination of Instructible Robots Connected via Cyber Systems," IEEE, Proceedings of the 4th Annual IEEE International Conference on Cyber Technology in Automation, Control, and Intelligent Systems, Jun. 4-7, 2014, pp. 43-48.

Tamadupala, Kartik, et al. "Planning for Human-Robot Teaming in Open Worlds", ACM, Inc., Journal, ACM Transactions on Intelligent Systems and Technology (TIST), vol. 1, Issue 2, Article No. 14, Nov. 2010, pp. 1-24.

Waibel, Markus, et al., "RoboEarth: A World Wide Web for Robots," IEEE Robotics & Automation Magazine, Jun. 14, 2011, pp. 69-82.

Wilson, Jason R., et al., "Analogical Generalization of Activities from Single Demonstration," Springer International Publishing Switzerland, Ibero-American Conference on Artificial Intelligence, IBERAMIA 2014: Advances in Artificial Intelligence, Nov. 12, 2014, pp. 494-505.

\* cited by examiner

```
601 ──── class OSL                                              // the high-level definition of the OSL component
602 ──── Script newscript
604 ──── Context newcontext   // this will hold the new learning context
606 ──── List currentdefs ← new List()   // holds the currently ongoing definitions
608 ──── List OSL peers ← new List()   // holds list of OSL components for sharing 610 ──── function initiateOneShotLearning(DefinitionType definition)
612 ────    newcontext ← generateLearningContext()
614 ────    newscript ← initializeScriptTemplate()
616 ────    currentdefs.add(definition)
618 ────    startSpec(definition)
        end function 620 ──── function learnUtterance(UtteranceSemantics us, UtteranceContext c)
622 ────    while us != {} do              // while there are expressions
624 ────       s ← first(us)                // get the first semantic expression
626 ────       switch(first(currentdefs))   // act based on definition type
628 ────          case "object":    addObjectSpecs(s,c)
                  break
630 ────          case "relation":  addRelationSpecs(s,c)
                  break
632 ────          case "event":     addEventSpecs(s,c)
                  break
634 ────          case "procedure": addActionSpecs(s,c)
                  break
636 ────          case "rule":      addRuleSpecs(s,c)
                  break
638 ────          case "goal":      addGoalSpecs(s,c)
                  break
               end switch
640 ────       us ← rest(us)                // remove first semantic expression
            end while
        end function
```

*FIG. 6A*

```
function finishOneShotLearning()           // complete learning, return the script
  endSpec(first(currentdef))               // finish current definition
  currentdef ← rest(currentdef)            // remove it from list
  if rest(currentdef) == {} then           // there are no pending definitions
                       finishScript()       // finalize the script
    if peers != {} then                    // if there is a list for sharing
      shareWithPeers(newscript)            // recursively share the scripts
  end if
end function function addObjectSpecs(UtteranceSemantics s,UtteranceContext c)
  checkObjectDefinitionUnknown(s,c)
  addObjectDefinition(s,c)
end function function addRelationSpecs(UtteranceSemantics s,UtteranceContext c)
  checkRelationDefinitionUnknown(s,c)
  addRelationDefinition(s,extractRelationObjects(s,c),c)
end function function addEventSpecs(UtteranceSemantics s,UtteranceContext c)
  checkEventDefinitionUnknown(s,c)
  addEventDefinition(s,c)
end function function addRuleSpecs(UtteranceSemantics s,UtteranceContext c)
  checkRuleDefinitionUnknown(s,c)
  antecedent ← extractRuleAntecedent(s,c)
  consequent ← extractRuleConsequent(s,c)
  addRuleDefinition(antecedent,consequent)
end function function addActionSpecs(UtteranceSemantics s,UtteranceContext c)
  checkActionDefinitionUnknown(s,c)
  addActionWithArguments(s,c)
end function function addGoalSpecs(UtteranceSemantics s,UtteranceContext c)
  checkGoalDefinitionUnknown(s,c)
  addGoalWithArguments(s,c)
end function
end class
```

SYSTEMS AND METHODS ENABLING ONLINE ONE-SHOT LEARNING AND GENERALIZATION BY INTELLIGENT SYSTEMS OF TASK-RELEVANT FEATURES AND TRANSFER TO A COHORT OF INTELLIGENT SYSTEMS

CROSS-REFERENCE TO RELATED APPLICATIONS

This application is the National Stage of International Application No. PCT/US2017/032010, filed May 10, 2017, which claims the benefit of U.S. Provisional Patent Application Ser. No. 62/334,171 filed May 10, 2016, which applications are hereby incorporated by reference in their entireties.

GOVERNMENT SPONSORSHIP

This invention was made with government support under grant number N00014-14-1-0149 awarded by the United States Navy. The government has certain rights in the invention.

BACKGROUND

Intelligent systems, such as robots, virtual agents, and other systems including artificial intelligence, can be typically trained to perform tasks using a variety of data-driven learning methods, such as learning from observations, learning from demonstrations, reinforcement learning, or other policy-based trial-and-error learning or planning methods. These approaches, however, require data sets for training, can take a long period of time to complete, and often require multiple training sessions with the intelligent system. As a result, these approaches are often infeasible in circumstances where time constraints or limitations regarding the trials the system can perform or the data the system has available for learning exist. Additionally, when used with autonomous intelligent systems, these approaches often require the autonomous intelligent system to be offline while being trained. An autonomous intelligent system that is offline does not process input sensory data or operate any of its effectors, nor does it perform any other computations internal to the system.

SUMMARY

Briefly, the present disclosure relates to systems and methods used by an intelligent system, such as an autonomous robot, virtual agent or other system including artificial intelligence, to learn how to acquire new knowledge it needs to perform a task in response to an instruction from a human instructor, to apply the acquired knowledge immediately as part of the task performance following the instruction, and to instruct other intelligent systems about the relevant knowledge for performing the task. The instructions may include spoken instructions from the human instructor, a set of written instructions, for example from one or more electronic files, video recorded instructions, etc. The learning may be accomplished free of training the intelligent system and instead may be based solely on the instructions given to the system. The instructions may come from a human instructor provided in a natural language format (spoken, written, or video recorded) and may include one or more deictic references. The instructions may also come from text-based files containing the instructions or from instructional videos. The instructions may be received while the intelligent system is online, and may be provided to the intelligent system in one shot, e.g., in a single encounter or transaction with the human instructor, or a single processing of the file or video containing the instructions. The instructions may also be generalized by the intelligent system, for example in the form of encoded knowledge, and automatically applied in similar cases without requiring additional instructions for those cases.

The intelligent system may include hardware components, software components, and an Operating System (OS). For example, the intelligent system may include one or more sensors, such as microphones, cameras, range finders, etc., and one or more effectors, such as grippers, manipulators, speakers, drive mechanisms, etc. The intelligent system may further include perceptual processing components, central processing components, and action processing components. The perceptual processing components may include a Natural Language Processing subsystem and a Vision Processing subsystem. The central processing components may include a Task Learning and Knowledge Sharing subsystem, one or more memory components, such as short-term working memory, long-term declarative and procedural memory, episodic memory, etc., together with Inference Engines, and one or more Planning subsystems such as task planning, motion planning, scheduling, etc. The action processing components may include a Natural Language Generation subsystem, a Gripper Manipulation subsystem, a Mobility and Navigation subsystem, which may include one or more maps, and a data communication subsystem, which may utilize one or more wireless or wired communication protocols.

The Natural Language Processing subsystem may include a speech recognizer, one or more parsers, such as syntactic, semantics, and pragmatic parsers, and a Dialogue Manager. The Dialogue Manager may separate a received instruction, which may include oral and/or visual portions, into elements and may tag the elements of the instruction with task-related knowledge types. Exemplary task-related knowledge types include an object type, an object property or relation type, an action or procedure type, an event type, a rule type, and a goal type. The Dialogue Manager may apply rules to separate and tag the received instruction.

The tagged elements may be provided to the Task Learning subsystem. The Task Learning subsystem may evaluate the tagged elements and determine whether additional information is needed in order to resolve a tagged element. If so, the Task Learning subsystem may notify the Natural Language Generation subsystem that clarification and/or additional information is needed. The Natural Language Generation subsystem may formulate and present one or more questions to the human instructor, for example by using a speech synthesis component and a speaker or by generating and transmitting a text-based output, e.g., to a computer or other data processing device used by the instructor. The human instructor's response may be received by the Natural Language Processing subsystem for analysis, for example by using the speech recognizer or a text analyzer if the instructor's response includes text-based elements, or the output of the Natural Language Generation subsystem may be stored in a file for later processing.

The Task Learning subsystem may process the tagged elements of the instruction. For example, the Task Learning subsystem may apply one or more algorithms to the tagged elements to generate one or more scripts that allow the intelligent system to apply the learned knowledge immediately, for example the intelligent system may immediately perform a newly learned procedure or may immediately adopt a newly learned goal. The one or more scripts may include an object script that contains an object description, a relation script that contains a relation description, a procedure script that contains action descriptions, an event script that contains event descriptions, a rule script that contains a rule description, and a goal script that contains goal descriptions. Scripts may make references to other scripts and thus form a script hierarchy. The Task Learning subsystem may interact with other components of the intelligent system when developing the one or more scripts to ensure that the new knowledge can be used intelligent system. For example, the Task Learning subsystem may interact with one or more of the action processing components to ensure procedures are in a form that can be carried out by the intelligent system. While generating the one or more scripts, the Task Learning subsystem may generalize aspects of the one or more scripts if the encoded knowledge is more generally applicable. For example, if an action can be performed on objects having similar attributes or characteristics to the one used during the instruction, then the script may be generalized for use with such other objects as well. In addition, the script may be generalized such that rules specified for a first event may be applied to other events having similar attributes or characteristics as the first event. The one or more scripts may be stored in a knowledge base accessible by the intelligent system's processing components. The intelligent system can then use the one or more scripts to perform new tasks, for example in response to the occurrence of the event associated with the task. The intelligent system can also apply the scripts in new situations where the generalizations apply.

The Knowledge Sharing subsystem may generate one or more messages containing the one or more scripts generated by the Task Learning subsystem. The Knowledge Sharing subsystem may pass the one or more messages to the data communication subsystem, which may transmit the one or more messages to a second intelligent system. The Knowledge Sharing subsystem may also transmit one or more other scripts not available at the second intelligent system but needed by the second intelligent system in order to fully implement or use the newly learned script. The second intelligent system may store the one or more received scripts in its knowledge bases. The second intelligent system may also execute the one or more scripts in order to perform a task, or pass on the encoded knowledge to yet another intelligent system. Knowledge sharing may occur among heterogeneous systems, e.g., robots and virtual agents, or between autonomous agents and any computer-based script storage location, e.g., a cloud-based script database for centralized access to scripts.

BRIEF DESCRIPTION OF THE DRAWINGS

The description below refers to the accompanying drawings, of which:

FIGS. 6A and 6B are partial views of an illustration of pseudocode of one or more example algorithms in accordance with an embodiment of the disclosure.

DETAILED DESCRIPTION OF ILLUSTRATIVE EMBODIMENTS

Multi-Agent Environment

Figure 1:
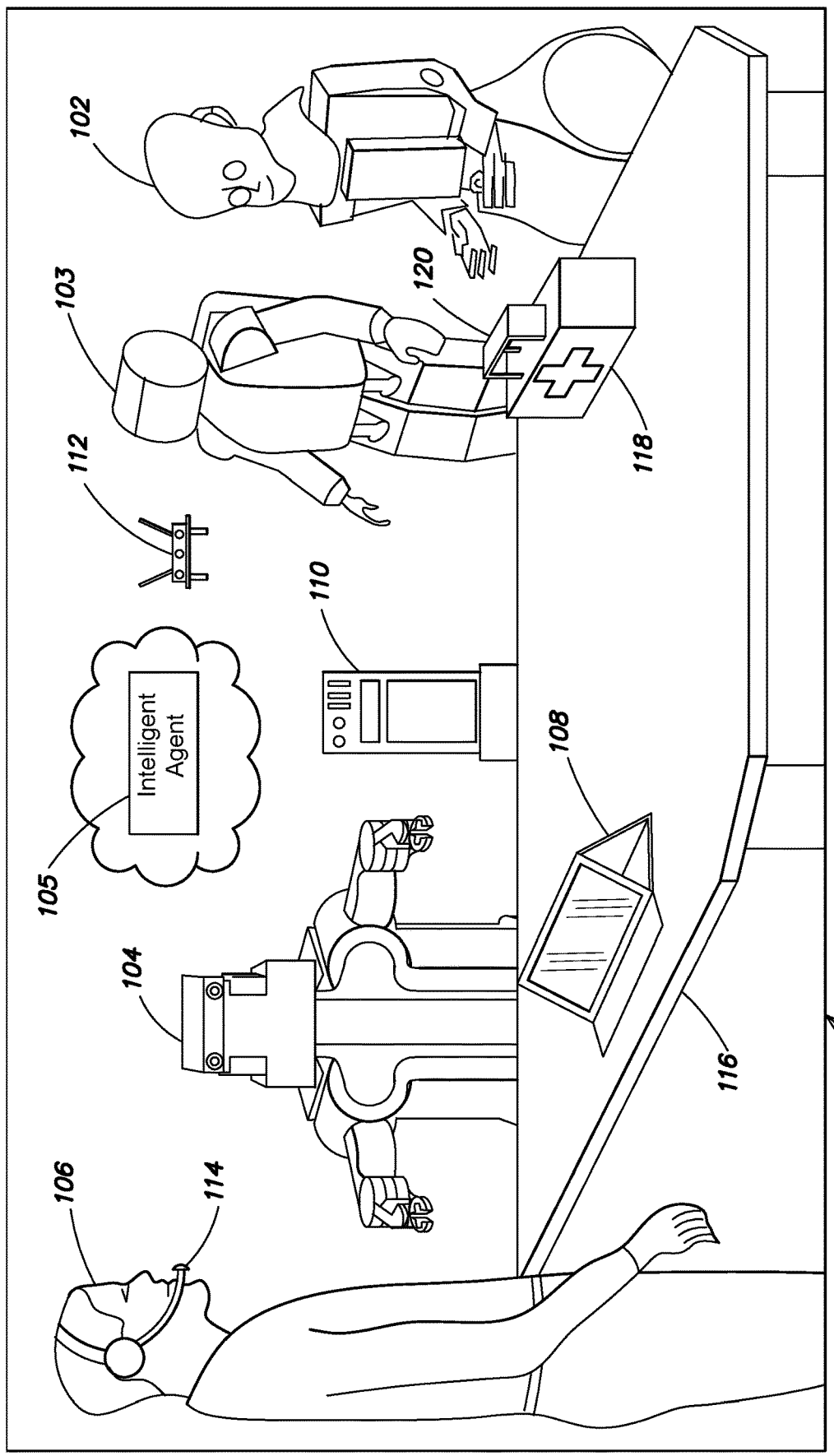
FIG. 1 is a schematic illustration of an example environment in accordance with an embodiment of the disclosure.

FIG. 1 is a schematic illustration of an environment 100 in which the present disclosure may be practiced in accordance with an embodiment. The environment 100 includes a plurality of intelligent systems 102, 103, 104, and 105 and a human instructor 106. One or more of the intelligent systems, such as the intelligent systems 102, 103, and 104, may be implemented as robot agents. In some embodiments, the robot agents 102, 103, and 104 may include different hardware/software architectures and different systems, resulting in the robot agents 102-104 having different capabilities. One or more intelligent systems, such as the intelligent system 104, may be implemented as a cloud-based intelligent agent. Together, the intelligent systems 102-105 may form a cohort of heterogeneous intelligent systems. The robot agents 102-104 themselves may form a cohort of heterogeneous robot agents. A robot agent may refer to an autonomous reactive and proactive software agent that possesses its own control thread. A robot agent may respond to messages and/or events in order to attain goals, and may support social interaction. A robot agent may be implemented on a single host, such as a single robot platform, or it may be distributed over multiple hosts and/or computational nodes. The robot agents may be autonomous and capable of movement within and interaction with the environment 100, the human instructor 106, and each other.

A cloud-based intelligent agent may refer to an autonomous reactive and proactive software agent that possesses its own control thread. A cloud-based intelligent agent may respond to messages and/or events in order to attain goals, and may support social interaction. A cloud-based intelligent agent may be distributed across a plurality of cloud-based servers and/or computational nodes. While not capable of movement, a cloud-based intelligent agent may be capable of spoken and/or visual interaction with the human instructor 106. The cloud-based intelligent agent may also interact with one or more other intelligent systems, such as one or more of the robot agents 102-104. Examples of cloud-based intelligent agents include the Alexa® intelligent personal assistant from Amazon.com, Inc. of Seattle, Wash., which may be accessed through the Echo® microphone/speaker interface also from Amazon, the Google Assistant® intelligent personal assistant from Google Inc. of Mountain View, Calif., which may be accessed through the Google Home® microphone/speaker interface also from Google, and the Siri® intelligent personal assistant from Apple Inc. of Cupertino, Calif., which may be accessed through iPhone®, iPad®, and other devices also from Apple.

The environment 100 may further include one or more data processing devices, such as a laptop computer 108, which is accessible to the human instructor 106, and a server 110 or other data processing device. One or more network devices, such as a wireless router 112, may be located within the environment. The one or more network devices may establish one or more data communication networks within the environment 100. The human instructor 106 may wear a headset 114, which may be operably connected to the laptop computer 108, for example using the Bluetooth communication protocol. Within the environment 100 are a plurality of objects, such as a table 116 and a medical kit 118. The medical kit 118 has a handle 120 and is disposed on the table 116.

The robot agents 102-104 and the cloud-based agent 105 may cooperate to form a multi-agent system (MAS). A MAS may be composed of multiple robotic and virtual agents that communicate and interact with each other in order to achieve a common goal or objective.

Robot Agent Architecture

Figure 2:
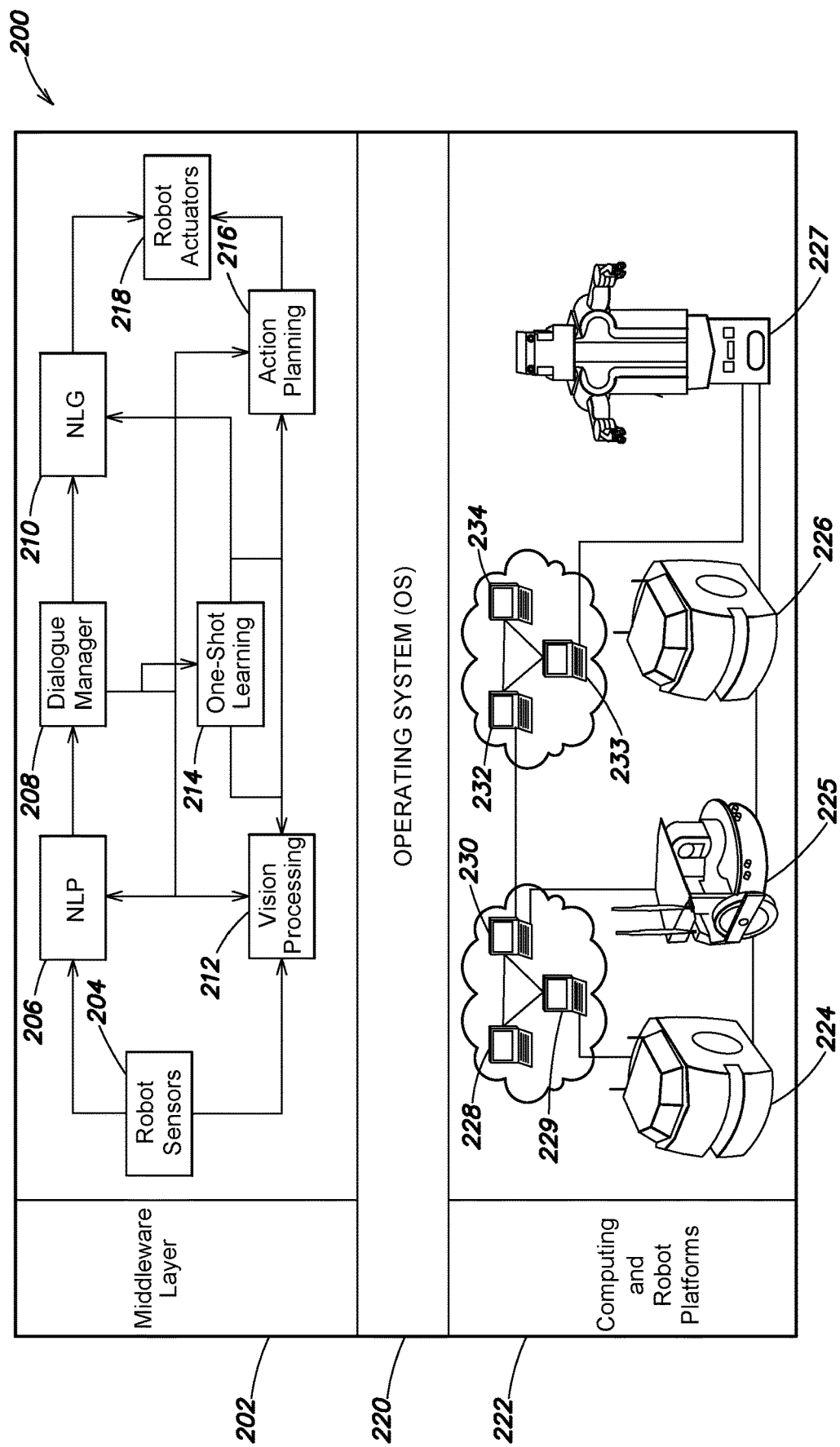
FIG. 2 is a schematic illustration of an example robot agent architecture in accordance with an embodiment of the disclosure.

FIG. 2 is a schematic illustration of a robot agent architecture 200 in accordance with an embodiment. The robot agent architecture 200 may include a middleware layer 202 that may include a plurality of middleware components. For example, the middleware layer 202 may include a Robot Sensors component 204, a Natural Language Processor (NLP) component 206, a Dialog Manager (DM) component 208, a Natural Language Generator (NLG) component 210, a Vision Processing component 212, a One-Shot Learning component 214, an Action Planning component 216, and a Robot Actuators component 218. The robot agent architecture 200 may further include an operating system (OS) 220 that interfaces with the middleware layer 202.

In an embodiment, the middleware components 204-218 may be implemented in an Agent Development Environment (ADE). The ADE middleware is described at least in part in V. Andronache et al. *ADE—An Architecture Development Environment for Virtual and Robotic Agents* (2005), which is hereby incorporated by reference in its entirety.

It should be understood that one or more of the middleware components may be realized in different ways, for example in some embodiments a set of middleware components may be realized in a single middleware component, or a single middleware component may be realized in multiple middleware components. Furthermore, the way functionality is described as being distributed or split over multiple middleware components is not essential for implementing and using the present disclosure. Other distributions of the described functionality may be utilized.

The middleware components 204-218 may be disposed on one or more physical robot platforms and/or computational nodes as indicated at layer 222. The computing and robot platforms layer 222 may include one or more robot platforms 224-227 and one or more data processing nodes 228-230 and 232-234 or other data processing resources. For example, in some embodiments, the middleware components 204-218 may be disposed on a single physical robot platform that includes on-board computational infrastructure in addition to sensory and motor control boards to gather information from sensors and provide actuation instructions. The on-board computational infrastructure may allow the robot platform to communicate with other robot platforms and data processing devices in the environment 100.

In other embodiments, one or more or all of the middleware components 204-218 may be distributed across multiple physical robot platforms and/or data processing devices.

The OS 220 may support data communication with other robot platforms and data processing devices. The data communication may conform to Ethernet® or Wi-Fi® data communication protocols, although other forms of data communication may be used, such as Infrared (IR), Bluetooth®, cellular data, etc. For example, the OS 220 may provide Internet Protocol (IP) features, such as packet routing, packet forwarding and ad hoc networking to be able to (1) form and use ad hoc networks among multiple intelligent systems within networking capabilities and (2) route packets through an ad hoc Wi-Fi® or other network of the cohort of intelligent systems. Suitable operating systems include the Windows® family of operating systems from Microsoft Corp. of Redmond, Wash., the Linux operating system and the macOS® family of operating systems from Apple Inc. of Cupertino, Calif., among others. In some embodiments, a real time operating system may be used.

When a robot agent 102-104 is connected to the Internet, it may make use of one or more knowledge repositories at which some or all of the robot agent's acquired knowledge may be stored, e.g., intermittently or permanently, before any knowledge transferred to other robot agents. A suitable technique for remote data storage accessible by the robot agents 102-104 is the RoboEarth network and database repository, as described in M. Waibel et al. "RoboEarth A World Wide Web for Robots (June 2011), which is hereby incorporated by reference in its entirety. In some embodiments, one or more ad hoc peer-to-peer data communication connections among the robot agents 102-104 may be used for knowledge transfer and knowledge storage.

One or more of the middleware components 204-218 may themselves be realized or implemented through a plurality of subsystems or elements. For example, one or more of the middleware components 204-218 may implemented through elements organized in a distributed integrated affect, reflection, cognition (DIARC) Architecture. The DIARC architecture is described at least in part in P. Schermerhorn et al. *DIARC: A Testbed for Natural Human-Robot Interaction* (2006), which is hereby incorporated by reference in its entirety.

Figure 3A:
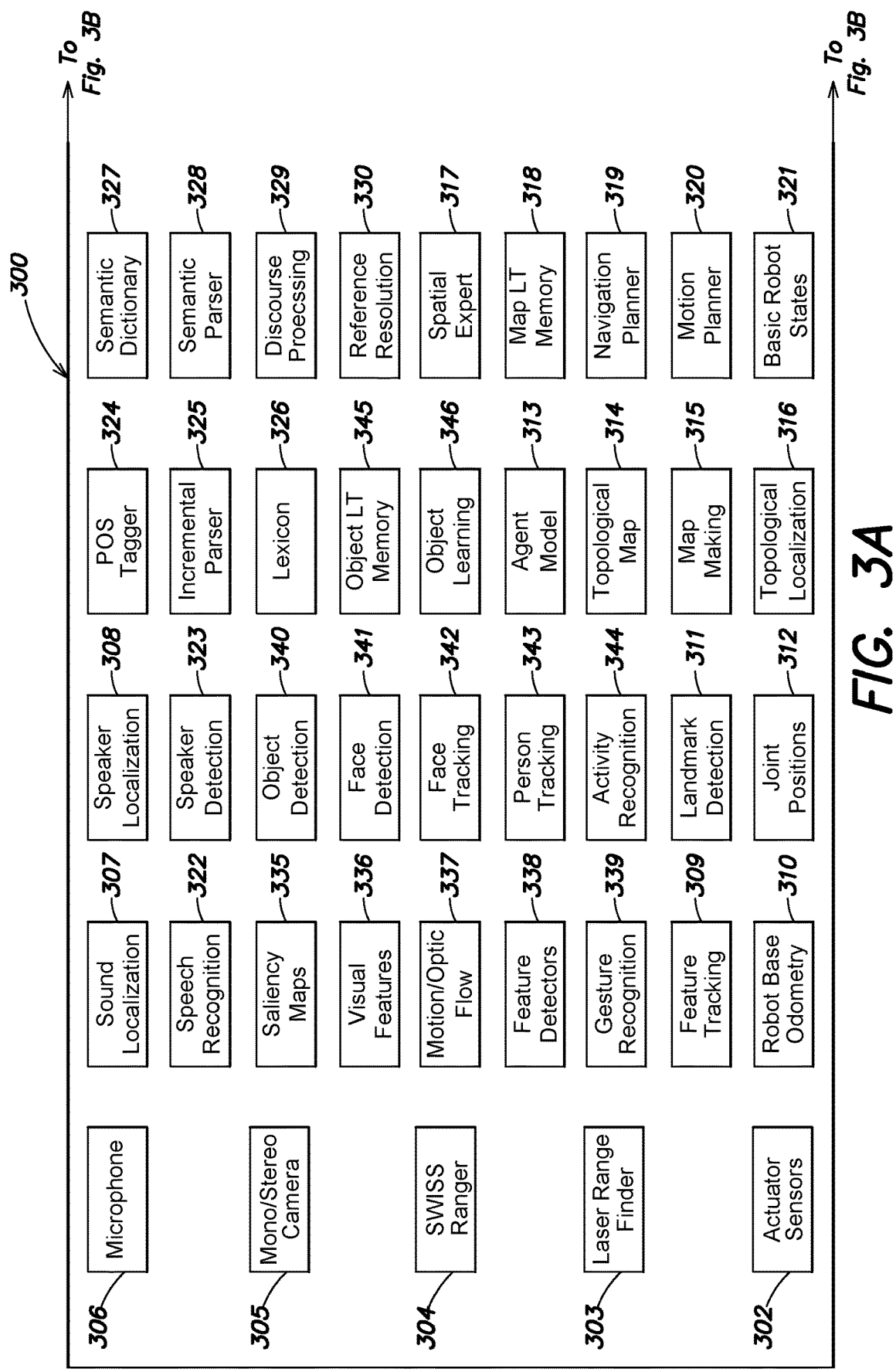
FIGS. 3A and 3B are partial views of a schematic illustration of a plurality of elements of a robot architecture in accordance with an embodiment.
Figure 3B:
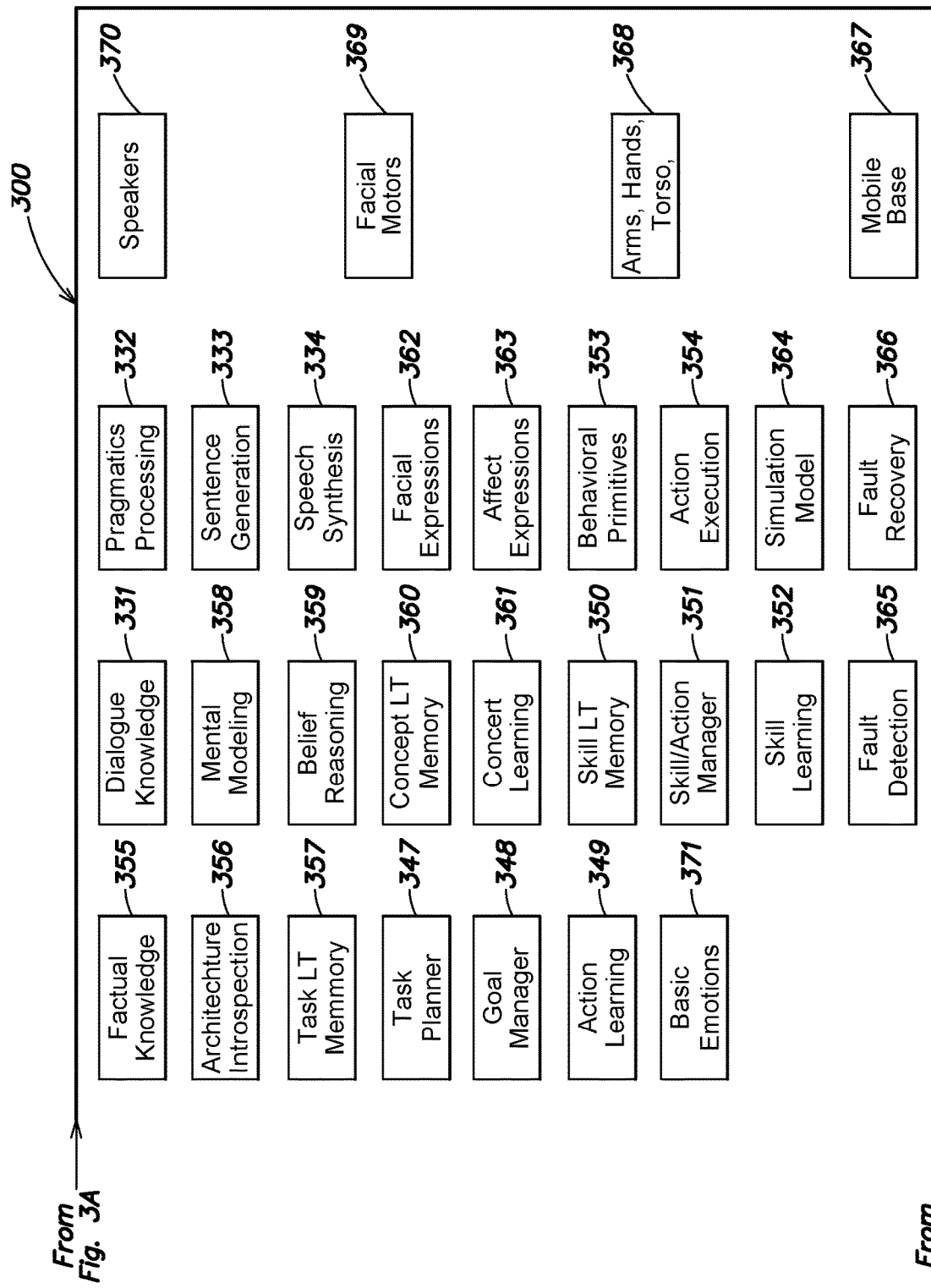

FIGS. 3A and 3B are partial views of a schematic illustration of a plurality of elements organized as a DIARC Architecture 300. For example, the Robot Sensors middleware component 204 may include an actuator sensors subsystem 302, a 2D or 3D laser range finder subsystem 303, a swiss ranger subsystem 304, a mono or stereo camera 305, one or more microphones 306, a sound localization subsystem 307, and a speaker localization subsystem 308. The microphone 306 together with sound processing hardware capture audio information from the human instructor 106. The microphone 306 may be mounted on the robot platform, in which case sound acquisition is on-board the robot agent. Alternatively or additionally, the microphone 306 may be attached to the human instructor 106, for example, by the headset 114, or it may be included in a data processing device, such as the laptop 108. In other embodiments, a microphone in the environment 100 that is close enough to the human instructor 106 to capture sound at a sufficient fidelity to allow for accurate processing of the sound information may be used. Processing of sound information, i.e., speech recognition, may be performed on-board or off-board of a robot platform, whether or not the robot platform acquires the sound onboard or not. For example, an audio board, which may include an Analog to Digital (A/D) converter that converts an audio signal to digital data and one or more digital signal processors (DSPs), may be included in the robot platform or on a data processing device.

It should be understood that a robot agent may include other sensors, such as a Kinect-based RGB-D sensor, a sonar sensor, a LIDAR sensor, etc.

In some implementations, the Robot Sensors middleware component 204 may further include a feature tracking subsystem 309, a robot base odometry subsystem 310, a landmark detection subsystem 311, a joint positions subsystem 312, an agent model subsystem 313, a topological map subsystem 314, a map making subsystem 315, a topological localization subsystem 316, a spatial expert subsystem 317, a map long term (LT) memory subsystem 318, a navigation planner subsystem 319, a motion planner subsystem 320, and a basic robot states subsystem 321.

The NLP component 206 may include a speech recognizer subsystem 322, a speaker detection subsystem 323, a parts-of-speech (POS) tagger subsystem 324, an incremental or syntactic parser subsystem 325, a lexicon subsystem 326, a semantic dictionary subsystem 327, a semantic parser subsystem 328, a discourse processing subsystem 329, and a reference resolution subsystem 330.

The NLG component 210 may include a dialogue knowledge subsystem 331, a pragmatic processing subsystem 332, a sentence generation subsystem 333, and a speech synthesis subsystem 334. The output of the speech recognizer may be a sequence of recognized words that are processed further by other functional elements of the Natural Language Process and Dialog Manager components 206, 208 of the middleware layer 202. The NLP and DM components 206, 208 may employ a Combinatory Categorical Grammar (CCG) approach for semantic parsing of the instruction from the human instructor. A suitable CCG approach is described in J. Dficzak et al. "What to do and how to do it: Translating Natural Language Directives into Temporal and Dynamic Logic Representation for Goal Management and Action Execution", Proceedings of the 2009 IEEE International Conference on Robotics and Automation (May 2009), which is hereby incorporated by reference in its entirety.

In some embodiments, instructions, in the form of language input, may be provided to a robot agent by the human instructor 106 in written form, e.g., typewritten or hand written. In this case, a keyboard-based interface for receiving typed instructions or a touch interface for receiving handwritten instructions may be provided at a data processing device, for example at the laptop computer 108. In other embodiments, the instructions will be provided in a text file or a demonstration video. In these cases, the text file or the video will be provided as input to the NLP component 206.

The Vision Processing component 212 may include one or more image acquisition devices allowing the robot platform to recognize features of and objects in the environment 100. In some embodiments, the Vision Processing component 212 may also include subsystems for obtaining additional sensory information, such as gestures and other types of meaningful expressive movements by the human instructor 106, such as eye gaze, bodily postures, etc. The additional sensory information may be used to determine the location and movements of the human instructor, in particular, movements that accompany natural language instructions, such as pointing gestures or action demonstrations. Such inputs may also come from sensors mounted on the human body (e.g., motion tracking sensors) or from sensors mounted in the task environment (e.g., cameras tracking the human motions) through wireless connections to the vision component.

The Vision Processing component 212 may further include perception processing subsystems, such as detectors for detecting environmental features, e.g., for navigation, objects, e.g., for manipulation, and human faces and body parts, e.g., for interaction with the human instructor, and trackers to track detected features over time. The perception processing subsystems may perform object and object feature detection, gesture recognition and activity detection, scene understanding, as well as local and large-scale map building of the environment. Specifically, the Vision Processing component 212 may include a saliency maps subsystem 335, a visual features subsystem 336, a motion/optic flow subsystem 337, a features detectors subsystem 338, a gesture recognition subsystem 339, an object detection subsystem 340, a face detection subsystem 341, a face tracking subsystem 342, a person tracking subsystem 343, an activity recognition subsystem 344, an object long-term memory 345, and an object learning subsystem 346. Subsystems of the Vision Processing component 212 may detect spatial relations (SRD) and recognize gestures (GR) such as pointing gestures. The activity recognition (AR) subsystem of the Vision Processing component 212 may detect task-relevant activities, such as a door-opening action or a walking activity.

The subsystems of the DIARC architecture 300 may interface with the robot agent's physical systems, i.e., the robot's sensors and actuators, through the OS 220.

The One-Shot Learning (OSL) component 214 may interact with the perception processing subsystems of the Vision Processing component 212 by (1) indicating to the perception processing subsystems which set of features in the environment to detect and track and (2) requesting detected and tracked features subject to certain constraints. The perceptual processing subsystems may also store acquired perceptual knowledge for detecting objects, relations, and events.

The NLP component 206 and the NLG component 210 together with the Dialog Manager component 208, which may be combined into a single natural language (NL) system, may handle all natural language interactions with the human instructor 106. This may include natural language understanding comprised of processing speech information, parsing the tagged sequence of words obtained from the speech recognizer and POS tagger subsystems, determining composite semantic information and modifying that information based on pragmatic context, determining dialogue state and any possible actions, dialogue or other. It may also include natural language generation including generating sentences that contain various pieces of information, for example clarification requests, updates to "intend-to-know" requests, etc., and producing the synthesized speech output. The NLP component 206 may detect any errors that may occur in natural language interactions, for example word recognition and parsing errors, lack of information, etc., and in cooperation with the NLG component 210 recover from these errors. The NL system may use acoustic communication in a natural language format for information exchange with the human instructor 106.

The Dialogue Manager (DM) component 208 may interact with the OSL component 214 in the following ways: (1) the DM component 208 may signal to the OSL component 214 when learning starts, which may cause the OSL component 214 exchange information with components, such as the vision processing components 212; (2) the DM component 208 may also inform the OSL component 214 when learning ends; (3) the DM component 208 may send the semantic representation of an instruction to the OSL component 214 for further processing; and (4) the DM component may receive a clarification request from the OSL component 214 which may then be communicated to the human instructor 106. The DM component 208 may also pass on referential and deictic descriptions with discourse reference resolved to the OSL component 214, so that the OSL component 214 can attempt to obtain referents from perceptual components and execute actions through the Action Planning component 216. Furthermore, the speech recognition subsystem 322 as well as NLP and NLG components 206, 210 may store acquired linguistic knowledge, such as acoustic features and labels, for newly learned knowledge types together with references to their representations in the various components processing them. The labels may include new labels for objects, relations, and events together with the reference to the configurations in the vision processing components to detect them. The labels may also include new labels for goals, procedures, and rules together with reference to existing goals, procedures, and rules in Action Planning component 216.

One or more subsystems of the Action Planning component 216 may be configured to determine the level of detail to be learned for objects, relations, procedures, events, rules, and goals, and for carrying out learned procedures. The Action Planning middleware component 216 may include a task planner subsystem 347, a goal manager subsystem 348, an action learning subsystem 349, a skill long-term memory subsystem 350, a skill/action manager subsystem 351, a skill learning subsystem 352, a behavioral primitives subsystem 353, and an action execution subsystem 354. Depending on the type of knowledge, different subsystems of the Action Planning component 216 may be involved. For example, procedure and rule scripts may be directly interpreted by one or more subsystems of the Action Planning component 216, the task planner subsystem 347 may interpret a goal script to find an appropriate action sequence to achieve a goal, which may also involve navigation and motion planning.

The DIARC Architecture 300 may include other subsystems, such as a basic emotions subsystem 371, a factual knowledge subsystem 355, an architecture introspection subsystem 356, a task long-term memory subsystem 357, a mental modeling subsystem 358, a belief reasoning subsystem 359, a concept long-term memory subsystem 360, a concept learning subsystem 361, a facial expressions subsystem 362, an affect expressions subsystem 363, a simulation model 364, a fault detection subsystem 365, and a fault recovery subsystem 366.

During a learning phase, the OSL component 214 may interact with the Action Planning component 216 to determine (1) a level of abstraction of the representation based on the actions already available in the robot agent and (2) whether a learned procedure needs to be specified in terms of sequences of effector configurations, such as way points and poses, or whether a goal position and configuration is sufficient. The advantage of moment-by-moment recording of effector location and pose is that the recorded trajectory can directly be played back. A "stop" gesture or a "follow me" gesture may be instructed this way. However, such trajectories may be less useful in cases where a robot agent's effector is very different from the one used for demonstration, for example, a robot arm with many degrees of freedom compared to a human arm. In that case, motion path planning may be a better option. The OSL component 214 may store learned action scripts, for example in a skill long-term memory, and goals, for example in a goal manager subsystem. Rules may be stored in the component that will subsequently handle them. For example, rules for goal constraints may be stored in the goal manager subsystem 348, rules for action constraints may be stored in the Action Planning component 216, and so on.

While generating new scripts, the OSL component 214 may attempt to determine if the type of a variable involved in a script entry, e.g., the type of a perceivable object, can be generalized to other types that contain the specified type, e.g., a supertype of the specified object. For example, if a "pick-up" action is taught for a medical kit (medkit) that is defined as "a white box with a red cross on it and a handle on top", through an instruction to grasp the medkit's handle, then the OSL component 214 may define the action for all objects with handles as the OSL component 214 may determine that only the handle matters for the pickup action. For example, the OSL component 214 may determine that, all subactions of the pickup action, such as moving the gripper to the handle, grasping the handle, and lifting the object by the handle, only pertain to the handle. The OSL component 214 may further determine that the presence of a handle can be detected by checking the type of object or object part involved in each subaction. Based on these determinations, the OSL component 214 may resolve that the learned "pick-up" script may be stored in generalized form and applied to any object with a handle, e.g., a suitcase, a mug, etc.

The Robot Actuators component 218 may include a mobile base subsystem 367, an arms, hands, torso subsystem 368, a facial motors subsystem 369, and one or more speakers 370, which may be on-board or off-board. The robot platform's sensory equipment may be independent of its actuation capabilities. That is, the robot platform may be able to detect a grasp action without itself being able to perform a grasp action, because the robot platform may not have a gripper.

Exemplary physical robot platforms suitable for use with the present disclosure include the PR2® robot from Willow Garage, Inc. of Palo Alto, Calif., the Mobile Dexterous Social Robot from Xitome Design, LLC of Warwick, R.I., the Baxter® and Sawyer® robots from Rethink Robotics of Boston, Mass., and the industrial robots from Kuka Robotics Corp. of Augsburg, Germany, among others. The PR2® robot platform is described in U.S. Pat. Publication No. 2015/0336264 for a Humanoid Robotics System and Methods, published Nov. 26, 2015, which is hereby incorporated by reference in its entirety.

Figure 4:
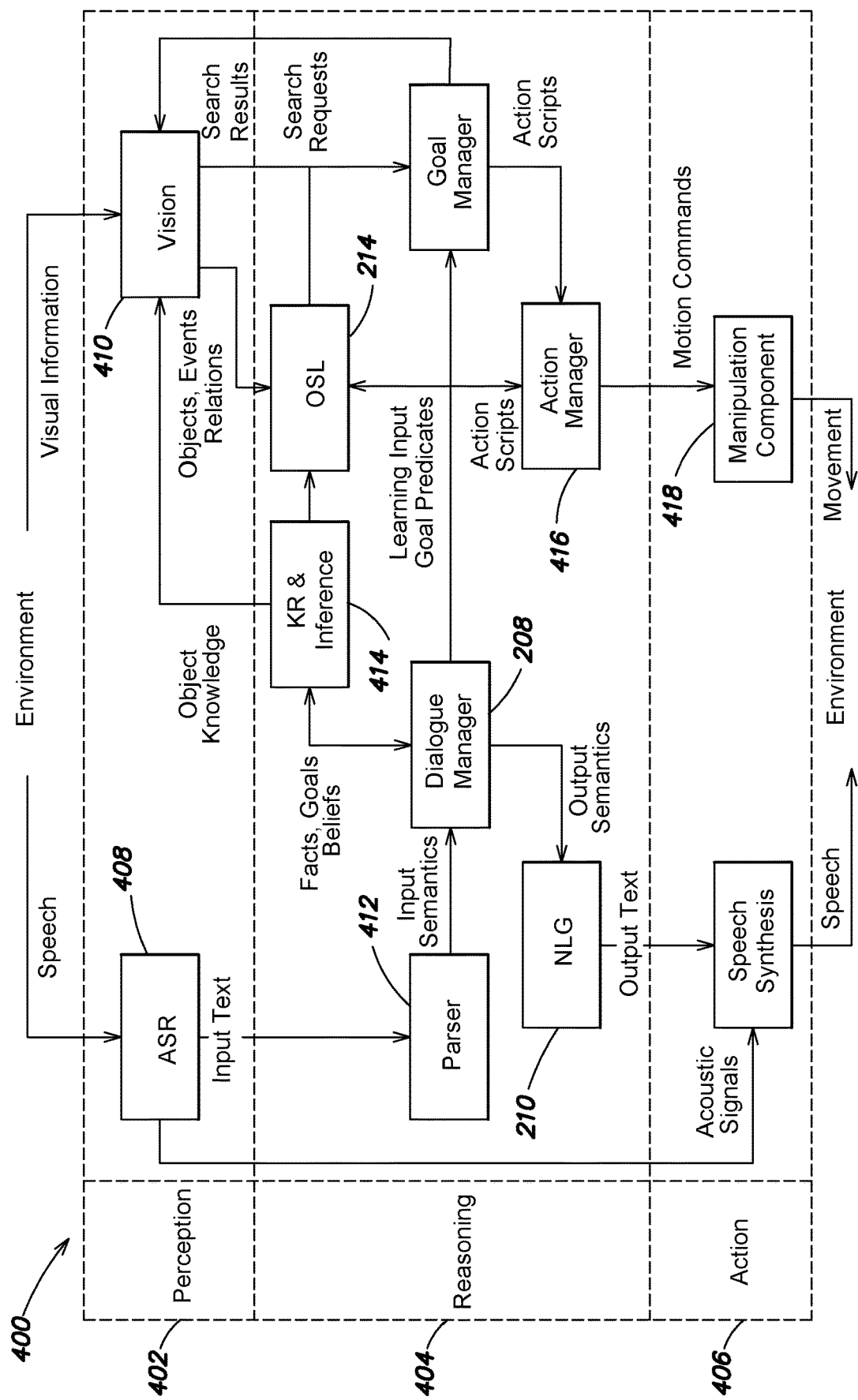
FIG. 4 is a schematic illustration of a portion of the architecture illustrated in FIG. 2 in accordance with an embodiment of the disclosure.

FIG. 4 is a schematic illustration of a portion 400 of the architecture 200 illustrated in FIG. 2 in accordance with an embodiment. The architecture portion 400 may be organized into a Perception layer 402, a Reasoning layer 404, and an Action layer 406. The Perception layer 402 may include an Automatic Speech Recognition (ASR) element 408, which may be similar to the Speech Recognition subsystem 322, and a Vision element 410, which may be similar to the Vision Processing component 212. The Reasoning layer 404 may include a Parser 412, which may include the Incremental Parser subsystem 325 and the Semantic Parser subsystem 328, the NLG component 210, the Dialog Manager component 208, a Knowledge Representation & Inference component 414, the Goal Manager subsystem 348, an Action Manager 416, which may correspond to the Action Planning component 216, and the OSL component 214. The Action layer 406 may include the Speech Synthesis subsystem 334 and a Manipulation Component 418. As with the DIARC architecture 300 and the middleware layer 202, multiple components in the architecture in FIG. 4 may be realized in one middleware layer component, for example the Goal Manager subsystem 348, the Action Manager 416 and the Manipulation component 418 may be realized in the Action Planning middleware component 216.

Initialization A robot agent may be initialized for one-shot learning. The initialization process may include two parts. First, the robot agent may be initialized with basic knowledge for operating in the environment 100 and for carrying out its tasks properly. This knowledge may be robot platform-specific and task-specific. Second, the robot platform may be initialized with generalized information that may apply across tasks and environments.

The required knowledge for OSL initialization may be broken down into several parts: first, the architecture should be equipped with the basic knowledge necessary for natural language interactions, for example acoustic and language models for the speech recognizer, lexical items with part-of-speech tags and their lexical semantics for the NL dictionary, any parser-based knowledge such as grammar rules, pragmatic as well as dialogue rules, knowledge for sentence generation, and pronunciation rules for the lexicon in order for the robot platform to be able to understand the possible task-based instructions the human instructor might use for a given task. The extent of the present NL knowledge, namely what words and phrases can be used to instruct the robot platform may significantly influence what kinds of task-relevant features can be learned by the robot platform.

In addition to the NL subsystem, the perceptual systems should be equipped with detectors, trackers, and image processors for the different available sensors such that, if their results are appropriately combined, they will allow for the detection of the objects and events the robot platform is supposed to learn. Similarly, the action subsystem should be equipped with the necessary primitive actions, action scripts, and plan operators for the task planner to be able to learn the activities and rules the robot platform is supposed to learn. Most of these knowledge items, which pertain to low-level perceptual features and behaviors, may be stored in a number of alternative formats, e.g., a robot-specific representation. However, information that is to be shared among robot platforms preferably uses the script representations described herein.

For knowledge transfer, other intelligent systems running an OSL component may be connected via networked communication so that the intelligent system acquiring the new knowledge can connect to the other intelligent systems in the cohort and transfer the knowledge through its OSL component, which may recursively transmit all required knowledge items.

Figure 5A:
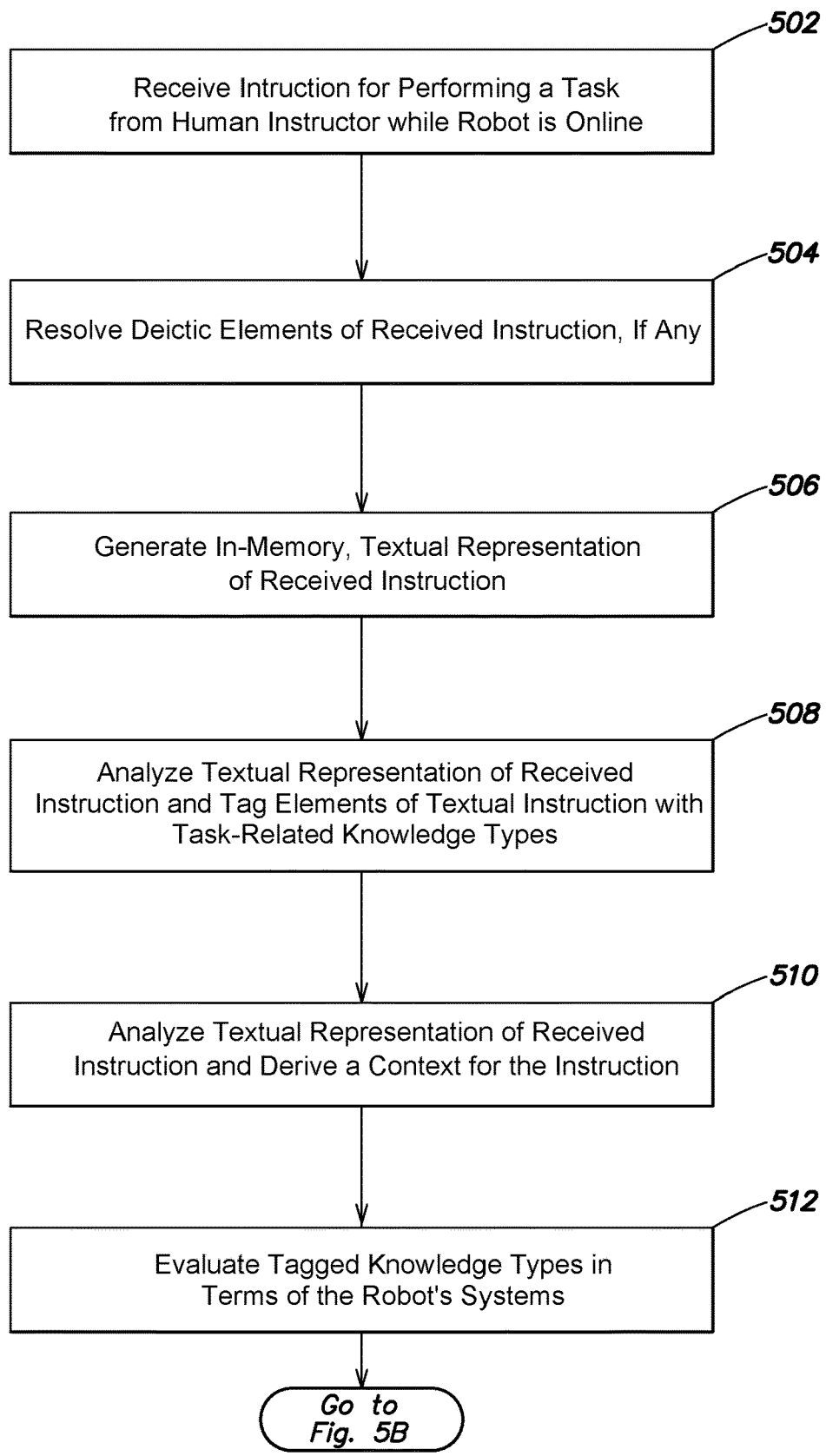
FIGS. 5A-C are partial views of a flow diagram of an example method in accordance with an embodiment of the disclosure.
Figure 5B:
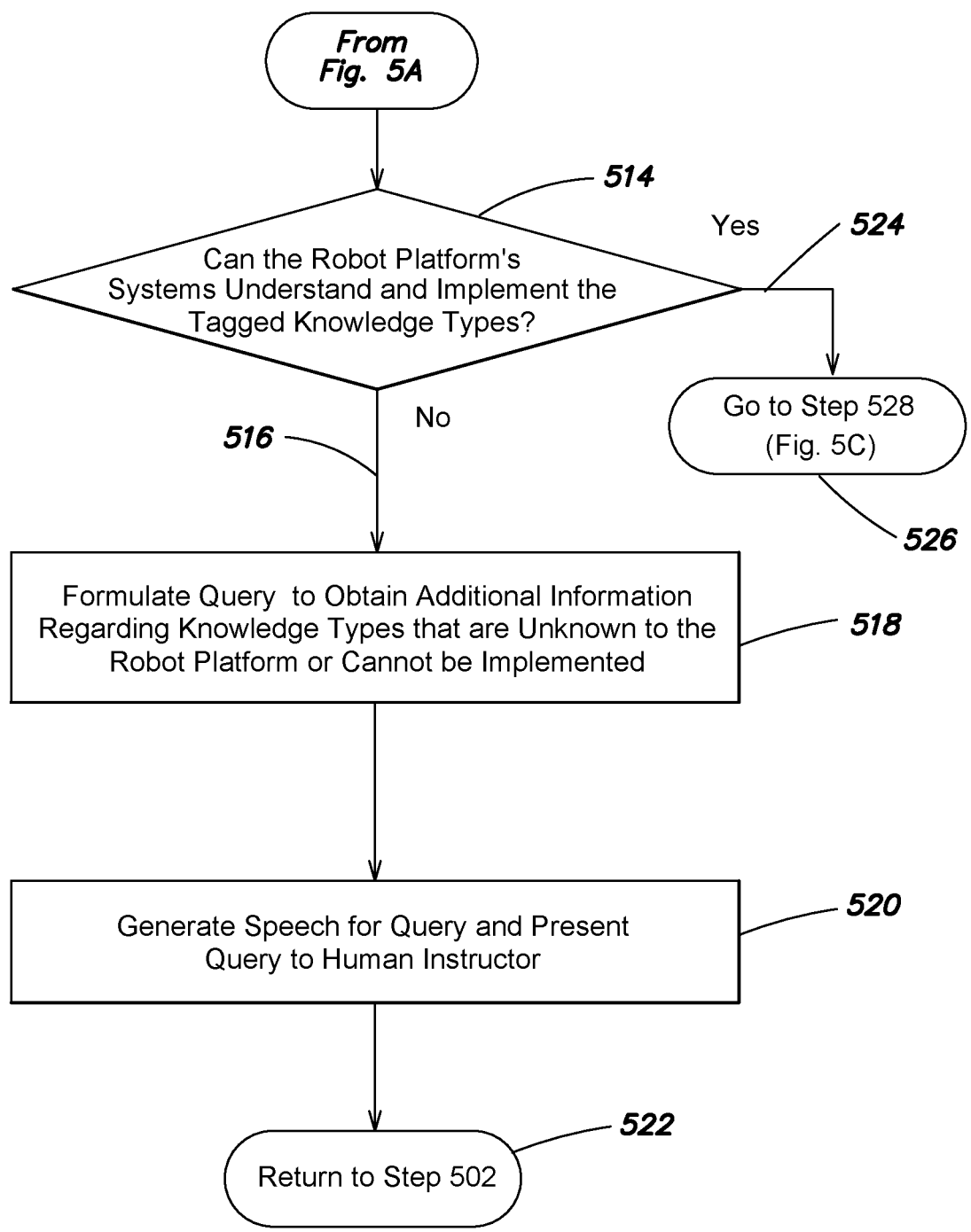
Figure 5C:
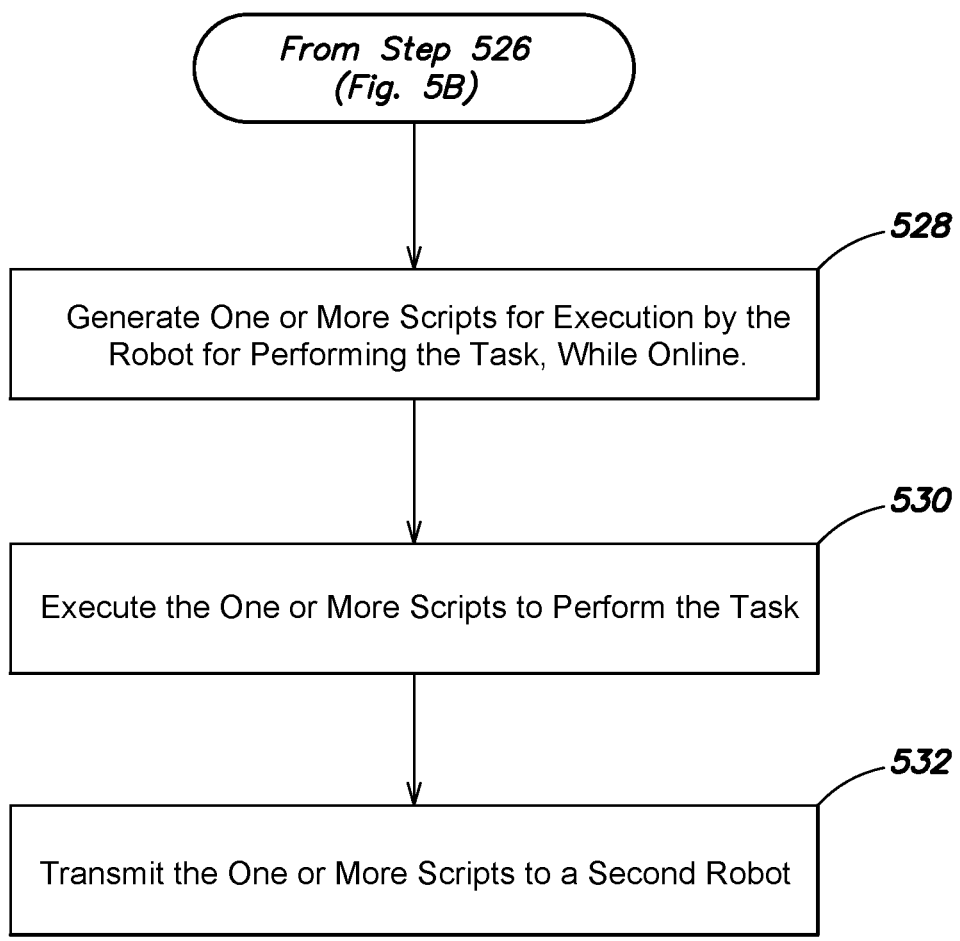

FIGS. 5A-C are partial views of a flow diagram of an example method in accordance with an embodiment.

The Robot Sensors component 204, the Vision Processing component 212, the NLP component 206 and the DM component 208 may receive an instruction from the human instructor 106 to perform a task while the robot agent is online, as indicated at step 502. The instruction may be provided in an oral, natural language format or it may be provided in written text format through keyboard or other text input device, or it may be provided in the form of a file containing written instructions. The instruction may include one or more deictic references from the human instructor 106. The robot agent may resolve the one or more deictic references included in the instruction, as indicated at step 504. In some embodiments, a general logical form of instructions for teaching a robot agent new words for objects, relations, events, rules, goals, and actions is as follows:

Given a set of objects Objs, relations Rels, events Evs, actions Acts, goals Gls, and rules Rls, and corresponding sets of natural language expressions Wobjs, Wrels, Wevs, Wacts, Wgls, and Wrls denoting elements in them, respectively, then the natural language expression U(w,Wobjs, Wrels,Wevs,Wacts,Wgls,Wrls) is a definition of a concept denoted by a word w if U contains w in a way that marks w as the definiendum, e.g., w is used to denote what is being defined, such as saying "A med kit is . . . " or "I will teach you how to pick up . . . " and the rest of the U, the definiens, involves any number of expressions from Wobjs, Wrels, Wevs, Wacts, Wgls, and Wrls in a compositional fashion, e.g., "white box with red cross on it" or "stay within one meter", such that the composite meaning can be determined from the meaning of its parts.

| Utterance Types | |
|---|---|
| <manipulationCommand> | (<subject>) <manipulation verb> <object> |
| <actionCommand> | (<subject>) <actionVerb> |
| <propertyLearning> | <object> <equality> <objectProperty> <relation> <object> \| <objectProperty> <relation> <object> <equality> <object> |
| <definition> | <unknown> <identity> [<manipulationVerb> \| <actionVerb> \|<objectProperty> \| <object>] |
| <actionTeachingStart> | <startTeachingPrefix> [<actionVerb> \|<manipulationVerb> <object>] |
| <actionTeachingEnd> | <endTeachingPrefix> [<actionVerb> \|<manipulationVerb> <object>] |
| <objectLearning> | <learningPrefix> <object> |
| Expandable Definitions | |
| <manipulationVerb> | pick up \| grab \| look for \| find \| give me \| point to \| hand over \| . . . |
| <actionVerb> | stop \| start over \| go <direction> \| come here \| follow me \| relax \| [raise \| lower] your hands \| crouch \| stand up \| . . . |
| <object> | <object property> <object> \| <object> <relation> <object> \| (a \| an \| the) [knife \| ball \| mug \| box \| . . . |
| <objectProperty> | <color> \| <shape> \| <size> \| <texture> \| <part> \| . . . |
| Fixed Definitions | |
| <relation> | part of \| next to \| on top of \| to the [left \| right] of \| of the \| . . . |
| <equality> | is \| . . . |
| <identity> | means (the same thing as) \| is the same as \| is like \| . . . |
| <actionTeachingStart> | I will [show \| teach] you how to \| this is how [you \| to] \| I will explain how to \| . . . |
| <actionTeachingEnd> | that is how you \| . . . |
| <objectLearning> | [this \| that \| here] is [the \| this \| that] object in front of you is \| . . . |

-continued

| | |
|---|---|
| <color> | red \| blue \| yellow \| green \| purple \| orange \| black \| white \| gray \| ... |
| <shape> | round \| square \| triangular \| ... |
| <size> | biggest \| smallest \| shortest \| longest \| ... |
| <texture> | shiny \| rough \| checkered \| ... |
| <part> | top \| bottom \| side \| end \| ... |
| <direction> | left \| right \| forward \| backward |

Table 1 shows examples of utterance types used for instructing new knowledge

The DM component 208 may generate an in-memory semantic representation of the received instruction, as indicated at step 506. In an embodiment, the in-memory representation may be a formal textual representation, a vector-based representation, or some other representational form that captures the semantics of the instruction. The OSL component 214 may analyze the semantic representation of the received instruction and tag elements of the semantic representation with task-related knowledge types, as indicated at step 508. The OSL component 214 may analyze the tagged semantic representation of the instruction and derive a context for the instruction, as indicated at step 510. The context may include the current perceptual context (e.g., if the instruction is about new perceivable objects, relations among perceivable objects, actions related to perceivable objects, or events involving perceivable objects and actions on those objects), current action context (e.g., what actions the agent just completed or observed), current goal context (e.g., the goals in whose service the current instruction was made), current task context (e.g., the context in which the whole interaction is taking place), and additional contextual constraints given by rules, e.g., rules constraining what actions are allowed during task performance.

The DM component 208 may evaluate the tagged knowledge types in terms of the robot agent's subsystems, as indicated at step 512. As a result of this analysis, the DM component 208 may determine whether the agent's subsystems understand and can implement the tagged knowledge types, as indicated at decision step 514 (FIG. 5B). If any of the tagged knowledge types are unknown to the robot platform, or cannot be performed, the DM component 208 may formulate a query to obtain further information to clarify the unknown knowledge type or request an alternative approach to the task, as indicated by No arrow 516 leading to step 518. The NLG component 210 may generate a verbal query and play it through the speaker 370, as indicated at step 520. Processing may then return to step 502, where the robot agent receives a clarifying instruction in natural language format from the human instructor 106, as indicated by Go To step 522.

Returning to decision step 514, if the tagged knowledge types are known to the robot agent, and no clarification from the human instructor 106 is needed, the OSL component 214 utilizes the information from the instruction to generate one or more scripts executable by the robot agent, as indicated by Yes arrow 524, leading to Go To step 526, and step 528 (FIG. 5C). The one or more scripts may be generated while the robot agent is online, and may be stored in memory. The memory may either be onboard memory or remote memory. The robot agent may execute the one or more scripts to perform the task, as indicated at step 530. In addition, the robot agent may transmit the one or more scripts to a second robot agent, for example to another robot platform of the robot cohort, as indicated at step 532.

Script Generation

In an embodiment, the OSL component 214 either alone or in cooperation with one or more other components implemented in the middleware layer 202, such as the DM component 208, may analyze an instruction from the human instructor 106 and associate parts of the instructions with one of the following six task-related knowledge types: (i) objects, (ii) relations among objects, (iii) actions and procedures, (iv) events, (v) rules, and (vi) goals. For example, the OSL component 214 may mark or tag the parts of the instructions with the task-related knowledge types.

Definitions and examples of the knowledge types are as follows:

Object: a perceivable entity typically made out of parts, where the parts may be other objects or they may be textures. Example: a medical kit defined as a white box with a red cross on it.

Relation: a perceivable or non-perceivable property or relationship among objects or object parts. Example: the red cross on the white box part of the medical kit.

Procedure: a sequence of typically primitive actions that are contingent on perceptions and environmental make-up. Example: picking up means to grasp and to lift.

Event: one or more perceivable or non-perceivable changes in the environment. Example: a heart attack is a condition of insufficient heart functionality.

Rule: a general "if-then' statement", where the left side of the statement is a condition and the right side is a statement, an action, or a goal. Example: a med kit is only supposed to be used in emergency situations.

Goal: a set of states that need to or should be achieved or maintained subject to one or more constraints. Example: find a med kit and deliver it to Commander X.

The Vision Processing component 212 in cooperation with the NLP and DM components 206, 208 may resolve deictic references from the human instructor 106 into one or more of the six knowledge types. The following are examples of deictic references made by a human instructor that are resolved to particular knowledge types:

Object: "this [points to the med kit] is a med kit",

Relation: "this [points to an item] is on top of that [points to another item]", Procedure: "put this [points to the rope] in here", Event: "when this light [points to the light] is lit, our mission is over", Rule: "never put one [points to an item] in here [points to an location]", and Goal: "be over there [points to a location] after you are done with cleaning up here".

FIGS. 6A and 6B are partial views of an illustration of pseudocode 600 of the Java class implemented by the OSL component 214 for one shot learning in accordance with an embodiment. The algorithm may create an encoded knowledge representation of the instruction from the human instructor 106 in the form of one or more scripts that capture the acquired knowledge in a way that allows the robot agent to use the knowledge, e.g., to detect an object or event, or to carry out an instruction. For example, the robot agent can immediately, for example from the perception of the human instructor and/or without delay, execute a procedure for the instruction and/or transfer the procedure to one or more other robot agents. Depending on the contents of the instruction, the algorithm may generate one or more of the following scripts:

an object script: contains the definition of one or more objects,
a relation script: contains a definition of one or more relations,
a procedure script: contains one or more action descriptions in terms of primitives and other action scripts,
an event script: contains one or more event descriptions,
a rule script: contains one or more rule descriptions, and
a goal script: contains one or more goal descriptions.

The OSL component 214 may combine multiple scripts into a single script or procedure. For example, a procedure script may include or reference an object script and an event script.

Knowledge Representation

To capture definitions of objects, relations, procedures, events, rules, and goals included in the instruction, the OSL component 214 may create a knowledge representation to represent these different parts of an instruction. The knowledge representation may be in the robot agent's factual knowledge subsystem 355, goal manager subsystem 348, or at other components or elements of the robotic architecture. Furthermore, a script may be defined as an ordered list of any of the elements of Table 2 below subject to element-specific constraints:

TABLE 2

| | |
|---|---|
| type | specifies the type being described (e.g., action, thing) |
| name | linguistic description of this script representation (e.g., verb, noun, etc.) |
| precond | specify conditions that must be true at the beginning of an action, event, etc. |
| operatingcond | specify conditions that must be true throughout an action, event, etc. |
| postcond | effects that obtain when the action, event, etc. completes |
| benefit, cost, timeout | the benefits, costs, and time limit for the action, event, etc. |
| minurg, maxurg | the minimum and maximum urgency for an action, event, etc. |
| var, varname, vartype | a variable definition (variables are typed, and must include the name of the variable and its type) |
| actspec | an action specification (can be a primitive action or a script, with arguments) |
| goalspec | a goal state description |
| controlspec | a flow control element (e.g., if, while, etc.) |
| objectspec | an object specification |
| eventspec | an event specification |
| rulespec | a rule specification |
| relationspec | a relation specification |

In some embodiments, all algorithms for one-shot learning, knowledge generalization, and knowledge transfer may be implemented in the OSL component 214. An example of a main Java OSL class 601 is illustrated in FIG. 6A in pseudocode. The class holds variables for the script to be assembled, as indicated at 602, for the learning context, as indicated at 604, a list data structure for ongoing definitions to keep track of all concurrently taught concepts, as indicated at 606, e.g., through nested instructions, as described in the Illustrative Example below, and an optional list of peer OSL components for knowledge sharing, as indicated at 608.

The DM 208 may indicate to the OSL component 214 that a teaching instruction is forthcoming by calling an "initiateOneShotLearning" function, as indicated at 610, in the OSL component 214, which may initialize the class 601 variables by setting up a learning context, as indicated at 612, using information from other components in the architecture about their states, e.g., the state of the Goal Manager subsystem 348 or the Vision Component 212. The "initiateOneShotLearning" function may also generate a script template, as indicated at 614, and may store the type of definition that is expected subsequently, as indicated at 616, as determined by the DM 208. And, it may start setting up the script content using a "startSpec", as indicated at 618, for the particular type of definition, e.g., an event specification.

In some implementations, learning may be indicated in two main ways. For example, it may be implicitly triggered using a novel word that the NLP and DM components 206, 208 do not understand or by explicitly initiating the learning interaction, e.g., using phrases such as those indicated in Table 1. In both cases, the OSL component 214 may continue processing instructions, determine the type of definition, and generate new script presentations of the instructed knowledge until the teaching process is completed. This may again be implicitly determined when all unknown words have received definitions, or when an explicit instruction is given that the teaching is over, for example using a "finishOneShotLearning" function, as indicated at 642 (FIG. 6B). Examples are provided in Table 1. The "finishOneShotLearning" function may first finish the current definitions, as indicated at 644, and may remove it from the list of currently taught definitions, as indicated at 646. The function may then check if there are no more definitions, as indicated at 648, in which case it may finish the script, as indicated at 650. If a peer list is not empty, as indicated at 652, the function may also share the script with all peers in the cohort, as indicated at 654. In some implementations, this may lead to recursive sharing of subscripts referenced in a newly learned script if the peers do not have those scripts in any of their knowledge bases.

When a learning sequence is started, the OSL component 214 may repeatedly receive new utterance semantics from the DM component 208 for instructions through a "learnUtterance" function, as indicated at 620 (FIG. 6A), together with a DM discourse context. As long as semantic expressions are available, as indicated at 622, the first one may be considered, as indicated at 624, and depending on the current definition type, as indicated at 626, different functions for extracting definitions for the respective types may be called, as indicated at 628 through 638. Then, the incorporated semantic expression may be removed from the list, as indicated at 638, and the remaining expressions may be considered.

An "addObjectSpecs" function, as indicated at 656, may check if there any unknown terms in the utterance semantics, in which case the DM component 208 may be notified about the missing term, then the object definition may be added to the script.

An "addRelationSpecs" function, as indicated at 658, may check if there any unknown terms in the utterance semantics, in which case the DM component 208 may be notified about the missing term, then the relation definition may be added to the script together with objects used to define the relation, which may be extracted using the "extractRelationObjects" function.

An "addEventSpecs" function, as indicated at 660, may check if there any unknown terms in the utterance semantics, in which case the DM component 208 may be notified about the missing term, then the event definition may be added to the script.

An "addRuleSpecs" function, as indicated at 662, may check if there any unknown terms in the utterance semantics, in which case the DM component 208 may be notified about the missing term, then it may extract the rule's antecedent and consequent and may add the rule definition to the script.

An "addActionSpecs" function, as indicated at 664, may check if there any unknown terms in the utterance semantics, in which case the DM component 208 may be notified about the missing term, then the action definition with action arguments may be added to the script, possibly including flow control statements such as "if", "while", "until", etc.

An "addGoalSpecs" function, as indicated at 666, may check if there any unknown terms in the utterance semantics. In which case the DM component 208 may be notified about the missing term, then the goal definitions may be added to the script.

In all of the above functions 656-666, the utterance context may be considered to determine whether generalizations are possible, e.g., whether a goal specification can be generalized to other types of objects such as a "deliver med kit" goal that can be viewed as instance of a "deliver physical object" goal, and thus requires the same types of actions such as finding the object, picking it up, and transporting it to the delivery location. These generalizations may be performed by determining the highest type of a knowledge item in an ontological hierarchy of types that is common across script entries. For example, if a deliver procedure for med kits contains "finding" med kits which uses perceptual features such as a red cross on a white box, and "pick-up" which is defined for objects with handles, then the script can be generalized to objects that are white boxes with a red cross and a handle, but regardless of whether the object contains medical supplies, for example.

Illustrative Example

Below is an exemplary instruction from the human instructor 106 to the robot agent 102. The instruction instructs the robot agent about various aspects concerning the delivery of a med kit in case of a medical emergency. The instruction includes each of the six task-based aspects described in this invention:

Human (teaching a rule): "Never pick up a med kit unless there is a medical emergency".

Robot (acknowledging and asking for clarification): "Understood. But what is a med kit?"

Human (teaching an object): "A med kit is a white box with a red cross on it and a handle on top containing medical supplies."

Robot (acknowledging and asking for further information): "OK. And what does it mean that the handle is 'on top'?"

Human (explaining the relation): "On top means that the handle is above the box and is connected to it."

Robot (acknowledging and asking for action information): "Thank you. Can you also tell me how I can pick up a med kit?"

Human (detailing the procedure): "To pick up a med kit, move your hand into the handle with your palm facing up, grasp the handle, and then lift your arm a bit."

Robot (acknowledging and asking for a final clarification): "Got it. And what is a medical emergency?"

Human (defining an event): "A medical emergency is an event where a human is wounded and needs medical supplies."

Robot (acknowledging): "OK, understood."

Human (giving the robot a goal): "So, look out for medical emergencies, and when you detect one, find a med kit immediately and bring it to the human."

Robot (acknowledging): "OK."

Note that the robot agent asks for clarification whenever it encounters a term (underlined) in the instruction that the robot does not understand. In the following more detailed description, "output(NLU)" refers to the semantic expression produced by the NL components of the middleware layer 202.

"Never pick up a med kit unless there is a medical emergency."

NLU yields: $\forall y \neg \text{medicalemergency}(y) \rightarrow \forall x[\text{medkit}(x) \rightarrow \text{never}(\text{in}(y), \text{pickup}(R,x))]$ 5DM yields: Instruct(H,R,rule-definition,output(NLU))

OSL invocation: learnUtterance(output(DM),USAR)

As shown, the NLP component 206 is configured to generate correct semantics for this portion of the instruction, even though it does not have semantic definitions of three involved terms, i.e., "pick-up", "medkit", or "medical emergency". For example, the NLP component 206 may be configured to infer the syntactic role of these terms from their context in the instruction, e.g., "pick up" must be a verb following "never", "medkit" must be a "noun" following "a", "medical emergency" must be a compound noun following "there is". A suitable technique is described in R. Cantrell et al. "Learning Actions from Human-Robot Dialogues", Proceedings of the 2011 IEEE Symposium on Robot and Human Interactive Communication, July 2011, which is hereby incorporated by reference in its entirety.

The DM component 208 may be configured to recognize sentences in the form "always do X" or "never do X" as rules, and may initiate rule learning in the OSL component 214 by invoking "initiateOneShotLearning(rule-definition)" and subsequently pass on the definitions by invoking "learnUtterance". The OSL component 214 may check whether the rule is already in the knowledge base. The OSL component 214 may determine whether the knowledge store already includes a medical emergency rule. In this case, no preexisting rule is available. Since there is no current rule indexed by medicalemergency (the precondition of the rule), the OSL component 214 may store the rule. Meanwhile, the DM component 208 may generate clarification requests for the three new items: "pick up", "medkit", and "medical emergency". The DM component 208 may select an appropriate order of object, action, and condition, since the object properties might be necessary for specifying the actions used on the object and the action properties might be necessary for specifying the condition. Hence, the DM component 208 may first acknowledge the new rule ("Understood") and then together with the NLG component 210 produce the first clarification request ("But what is a medical kit?").

```
<type>
    <name>medicalemergency-rule</name>
    <var>
        <varname>?robot</varname>
        <vartype>actor</vartype>
    </var>
    <var>
        <varname>?obj</varname>
        <vartype>object</vartype>
    </var>
    <var>
        <varname>?e</varname>
        <vartype>event</vartype>
```

```
    </var>
    <objectspec>medkit(?obj)</objectspec>
    <rulespec>
        <antecedent>not(medicalemergency(?e))</antecedent>
        <consequent>not(permitted(in(e),pick-up(?robot,?
obj)))</consequent>
    </rulespec/
</type>
```

As noted, the human instructor 106 responds with "A medkit is a white box with a red cross on it and a handle on top containing medical supplies." The OSL component 214 may create the following representations.

NLU yields: medkit(x)↔color(x,white) ∧type(x,box) ∧color(y,red) ∧type(y,cross) ∧on(y,x) ∧type(z,handle) ∧ontop(z,x)∧∃v [medicalsupplies(v) ∧contains(x,v)]

DM yields: Instruct(H,R,object-definition,output(NLU))

OSL invocation: learnUterane(output(DM),USAR)

Specifically, the DM and NLG components 208, 210 acknowledge the new object definition ("OK") which the DM component 208 can now determine, for example from the fact that there is only one variable on the left side The DM component 208 may then pass the definition to the OSL component 214, which may interact with the Vision Processing component 212 to determine whether the Vision Processing component 212 knows all predicates. Note that, while "on top" here is not linguistically unknown, and thus no clarification request is generated by the DM component 208, the OSL component 214 may determine that the Vision Processing component 212 can resolve all predicates and relations except for what "a handle to be on top" means. For example, it is not clear that "on top" represents a relation. Accordingly, the OSL component 214 may prompt the DM component 208 to generate a clarification request for the meaning of the expression "type(z,handle) ∧ontop(z,x)".

The NLG component 210 may produce "And what does it mean that the handle is 'on top'". The OSL component 214 may then determine the incomplete visual specification waiting for additional information to be able complete the configuration of the Vision Processing component 212 that will allow it to detect med kits.

```
<type>
    <name>medkit-object</name>
    <var>
        <varname>?x</varname>
        <vartype>object</vartype>
    </var>
    <var>
        <varname>?y</varname>
        <vartype>object</vartype>
    </var>
    <var>
        <varname>?z</varname>
        <vartype>object</vartype>
    </var>
    <var>
        <varname>?v</varname>
        <vartype>object</vartype>
    </var>
    <objectspec>color(?x,white) and type(?x,box)</objectspec>
    <objectspec>color(?y,red) and type(?y,cross)</objectspec>
    <objectspec>type(?z,handle)</objectspec>
```

```
    <relationspec>on(?y,?x)</relationspec>
    <relationspec>ontop(?z,?x)</relationspec>
    <relationspec>exists(?v)(medicalsupplies(?v) and contains(?x, ?
v))</relationspec>
</type>
```

For the statement, "On top means that the handle is above the box and is connected to it.", the OSL component 214 may produce the following representation:

NLU yields: ontop(x,y) ↔above(y,x) ∧connected(x,y) ∧handle(y) ∧box(x)

DM yields: Instruct(H,R,relation-definition,output(NLU))

OSL invocation: learnUtterance(output(DM),USAR)

Specifically, the NLU (namely, NLP and DM components 206, 208) may determine that "ontop" takes two arguments. The DM and NLG components 208, 210 may then acknowledge the additional information ("Thank you"), and determine that this is a relation definition given that more than one variables occurs on the left side of the definition. The OSL component 214 may then correct the previous assumption about "on top" being a one-place predicate, and take the new definition to check with the Vision Processing component 212 whether it can detect "connected and above". When that is affirmed, the OSL component 214 may produce two new configurations of the Vision Processing component 212 based on the two definitions of "medkit" and "on top" that will allow the Vision Processing component 212 to detect med kits when requested in the future. While the incomplete definition of medkit is now complete, the DM component 208 still has two terms in need for clarification before the original rule definition can be completed. Accordingly, the DM and NLG components 208, 210 generate a further request, namely "Can you also tell me how I can pick up a medkit?"

```
<type>
    <name>ontop-relation</name>
    <var>
        <varname>?x</varname>
        <vartype>object</vartype>
    </var>
    <var>
        <varname>?y</varname>
        <vartype>object</vartype>
    </var>
    <objectspec>type(?x,box)</objectspec>
    <objectspec>type(?y,handle)</objectspec>
    <relationspec>above(?y,?x)</relationspec>
    <relationspec>connected(?x,?y)</relationspec>
</type>
```

The following representation may be generated from the human instructor's statement "To pick up a medkit, move your hand into the handle with your palm facing up, grasp the handle, and then lift your arm a few inches."

NLU yields (in sequence):
   achieve(self,relation(self,inside(hand,handle)),orientation(hand,palm,up));
   close(self,hand);
   lift(self,hand,5 in);

DM yields: Instruct(H,R,procedure-definition,output(NLU))

OSL invocation: learnUtterance(output(DM),USAR)

As indicated, the NLP component 206 extracts the different action primitives together with their arguments, and the DM component 208 infers that this is a procedure definition, which is can detect based on the initial phrase "to pick up a medkit". The semantics here may be closely tied to the motion planning capabilities of the robot agent. For example, the OSL component 214 may determine that the goal positions ("inside the handle") and orientation ("palm facing up") can be given to the Action Planning component 216, which can then determine a plan to bring the end effector ("hand") in the right position and orientation. The NLP component 206 may resolve several references ("hand", "handle", and "palm") as well as the semantics of "facing up" and "a few inches", which may be resolved to five inches to be a meaningful argument for the lift action. While it is possible to generate different semantic expressions, the above described use of goal positions and orientations instead of actions, such as a "move-hand-into-handle" primitive that might exist on some platforms, allows for more general action learning by the robot agent that is not tied to particular effector capabilities and motion trajectories of the particular robotic platform.

The OSL component 214 may then collect the individual instructions and generate a procedural script that is executable by the Action Planning component 216. As the OSL component 214 assembles the procedural script, it may check that all the variables and variable types are known to different components in the robot agent. The OSL component 214 may also ensure that all actions can be carried out by the robot agent. Otherwise, the OSL component may recursively generate one or more clarification requests for actions mentioned in the instructions. In this example, all actions are known, and the procedural script is assembled. The OSL component 214 may indicate completion to the DM component 208, which may direct the NLG component 210 to signal completion to the human instructor 106 ("Got it").

The DM component 208 may now ask for clarification for the last remaining item ("And what is a medical emergency?").

```
<type>
   <name>pickup-procedure</name>
   <var>
      <varname>?mover</varname>
      <vartype>actor</vartype>
   </var>
   <var>
      <varname>?obj</varname>
      <vartype>object</vartype>
   </var>
   <cost>unknown</cost>
   <timeout>unknown</timeout>
   <precond>
      <atstart>not(pickedup(?mover,?obj))</atstart>
   </precond>
   <postcond>
      <atend>pickedup(?mover,?obj)</atend>
   </postcond>
   <actspec>achieve(?mover,inside(hand(?mover),handle(?obj)),
                    orientation(palm(hand(?mover)),up)</actspec>
   <actspec>close(mover,hand(?mover))</actspec>
   <actspec>lift(mover,hand(?mover),5in)</actspec>
</type>
```

In response to the statement "A medical emergency is an event where a human is wounded and needs medical supplies.", the following representation may be generated:
NLU yields: medicalemergency(e)↔event(e) ∧∃x [in(x,e) ∧human(x) ∧ wounded(x) ∧∃y [medicalsupplies(y) ∧needs(x,y)]]
DM yields: Instruct(H,R,event-definition,output(NLU))
OSL invocation: learnUtterance(output(DM),USAR)

Once the DM component 208 receives the semantics for this statement from the NLP component 206, it may determine that this is an event definition because of the explicit use of "event" ("is an event where"). In some embodiments, human instructors may need to clearly mark events, for example to avoid complications in the NLP component 206 such as distinguishing event specifications from action specifications. The OSL component 214 may check with the Vision Processing component 212 whether those predicates further specifying the event ("in(x,e)") are known and can be detected. The Vision Processing component 212 may determines that "human" and "wounded" can both be detected, for example the first visually and the second through vision and through natural language. The OSL component 214 may determine that the last conjunct ("need medical supplies") is not about vision, for example through introspection of the predicates "needs(x,y)" and "medicalsupplies(y)".

The OSL component 214 may define a new events specification that can be used for detecting the event. The new events specification may consist of a perceptual component, which requires the Vision Processing component 212 to watch out for wounded humans, and a goal component, which may require the goal manager of the Action Planning component 216 to generate a goal, such as for the person to have medical supplies: "∃(y)[goal(self,goal(x,have(x,y))) and medicalsupplies(y)]". This goal may allow the robot agent to represent the need of the wounded person for medical supplies without making it immediately adopt the goal to get medical supplies. After assembling the procedural script, the OSL component 214 may determine that it has no more pending clarification requests, and may direct the DM and NLG components 208, 210 to acknowledge the last instruction ("OK, understood.")

```
<type>
   <name>medicalemergency-event</name>
   <var>
      <varname>?x</varname>
      <vartype>actor</vartype>
   </var>
   <var>
      <varname>?y</varname>
      <vartype>object</vartype>
   </var>
   <eventspec>
      <objectspec>exists(?x)(human(x) and wounded(?x))</objectspec>
      <objectspec>exists(?y)(medicalsupplies(?y))</objectspec>
      <relationspec>needs(?x,?y)</relationspec>
   </eventspec>
</type>
```

The following representation may be generated from the statement "So, keep looking out for medical emergencies, and when you detect one, find a medkit and bring it immediately to the human."
NLU yields two semantic expressions for the goals:
   maintain(checkfor(medicalemergency))
   ∀x [medicalemergency(x)→∃y∃h [find(y) ∧medkit(y) ∧deliver(y,h) ∧ human(h)∧in(h,e)]
DM yields: Instruct(H,R,goal-definition,output(NLU))
OSL invocation: learnUtterance(output(DM),USAR)

Here, the NLP component 206 may perform co-reference resolution to resolve that the human mentioned in the goal instruction is the same human as the one claimed to exist in the definition of the medical emergency. Suitable co-reference techniques are described in V. Ng "Supervised Noun Phrase Coreference Research: The First Fifteen Years", Proceedings of the ACL (2010), which is hereby incorporated by reference in its entirety. In some embodiment, the NLP component 206 may use open-world quantified goals that better capture the fact that the existence of a med kit is unknown to improve the semantics. Suitable techniques for using open-world quantified goals is described in K. Tamadupala et al. "Planning for Human-Robot Teaming in Open Worlds", ACM Transactions on Intelligent Systems and Technology, 1, 2, 14:1-14:24 (2010), which is hereby incorporated by reference in its entirety. The DM component 208 may pass the goal expression to the OSL component 214 together with the inferred high urgency based on the use of "immediately" in the statement. The OSL component 214 may generate one or more goal representations and action scripts, which may be both passed to the goal manager of the Action Planning component 216. The one or more goal representations and action scripts may also be stored either on-board or off-board for future use by the robot agent. The first goal may translate into a maintenance goal that will cause the Vision Processing component 212 to constantly look for medical emergencies. The second goal is a conditional goal, such that if a medical emergency is detected, the robot agent will attempt to find a med kit and deliver it to the human in the medical emergency. The OSL component 214 may insert a planning action into the script in cases where the med kit is not directly perceivable by the robot agent, and the robot agent may engage in search behavior.

```
<type>
    <name>medicalemergency-goal</name>
    <var>
        <varname>?robot</varname>
        <vartype>actor</vartype>
    </var>
    <var>
        <varname>?obj</varname>
        <vartype>object</vartype>
    </var>
    <var>
        <varname>?e</varname>
        <vartype>event</vartype>
    </var>
    <var>
        <varname>?human</varname>
        <vartype>actor</vartype>
    </var>
    <objectspec>medkit(?obj)</objectspec>
    <relationspec>in(?human,?e)</objectspec>
    <goalspec>
        <maintain>
            <control>do</control>
                <actspec>?e := checkeventtype(medicalemergency)</ac>
            <control>until ?e != { }</control>
            <actspec>search-for(?robot,?obj)</actspec>
            <control>if found(?robot,?obj)</control>
                <actspec>deliver(?robot,?obj(,?human))</actspec>
            <control>endif</control>
        </maintain>
    </goalspec>
</type>
```

Knowledge Sharing

To share learned knowledge with intelligent systems, the OSL component 214 may perform two steps. First, the OSL component 214 may recursively determine all constituent parts of the scripts to be shared, such as information referenced in the script that is stored in different components in the agent architecture 200. If a script includes references to other scripts, these other scripts may be evaluated by the OSL component 214 to determine whether they too need to be share. For example, the OSL component 214 may determine whether the other intelligent systems already have those scripts by querying their OSL components for the particular script. If the script is not present in the other intelligent systems, the OSL component 214 may recursively walk through the script to determine all missing scripts for each of the other intelligent systems, e.g., the script might contain references to other scripts that other OSL components do not have either. Once the OSL component 214 has identified all knowledge items to be shared, the OSL component 214 may connect to the OSL component of the other intelligent systems. In some embodiments, the OSL component 214 may connect to another robot or to remote repository. For this step, the middleware layer 202 may provide the connection method as well as data transfer channels. The middleware layer 202 may include a discovery component for finding the robot intelligent systems to be included in the cohort in the environment 100 or on the network. If the OSL component 214 cannot connect directly to the other intelligent systems through a data network, then NLP, DM, and NLG components 206, 208, 210 may be activated to exchange knowledge with the other intelligent systems through natural language. In some embodiments, only a small subset of natural language may be needed to communicate script representations between intelligent systems. Perceptual or motion information, such as images or trajectories, may or may not be communicated to the other robot agent. A suitable technique for knowledge sharing is described in M. Scheutz "'Teach One, Teach All'—The Explosive Combination of Instructible Robots Connected via Cyber Systems", IEEE Proceedings of Cyber Technology in Automation, Control, and Intelligent Systems (June 2014).

Once the data connection is established with the other intelligent systems, the second step may be performed by the OSL component 214. Here, the OSL component 214 may check the consistency of any referenced knowledge structures in the script. For example, the OSL component 214 may confirm that items are consistently named in all of the scripts being transferred to avoid conflicts with existing names in the other intelligent systems. The OSL component 214 may act as a broker for negotiating what needs to be shared with the other intelligent system, as different intelligent systems may have different levels of knowledge. Furthermore, one or more intelligent system may act as relay stations for transferring knowledge to the other intelligent systems. The knowledge being transferred may be stored by other components of the middleware layer 202 besides the OSL component 214. For example, knowledge about object types referenced in the scripts may be stored in the NLP, DM, and/or Vision Processing components 206, 208, 212. Throughout this knowledge transfer process, the components of the middleware layer 202 may be responsible for maintaining connectivity between the intelligent systems or other data processing devices, for example, using a peer-to-peer connection, and for ensuring error detection during transmission and recovery from faults. Once all knowledge items are transferred to the other intelligent systems, the OSL component at the intelligent systems may verify that all relevant content is present by recursively walking through a top script and checking that all scripts references in the script are present. The other intelligent systems may then disconnect the data communication channel.

Figure 7:
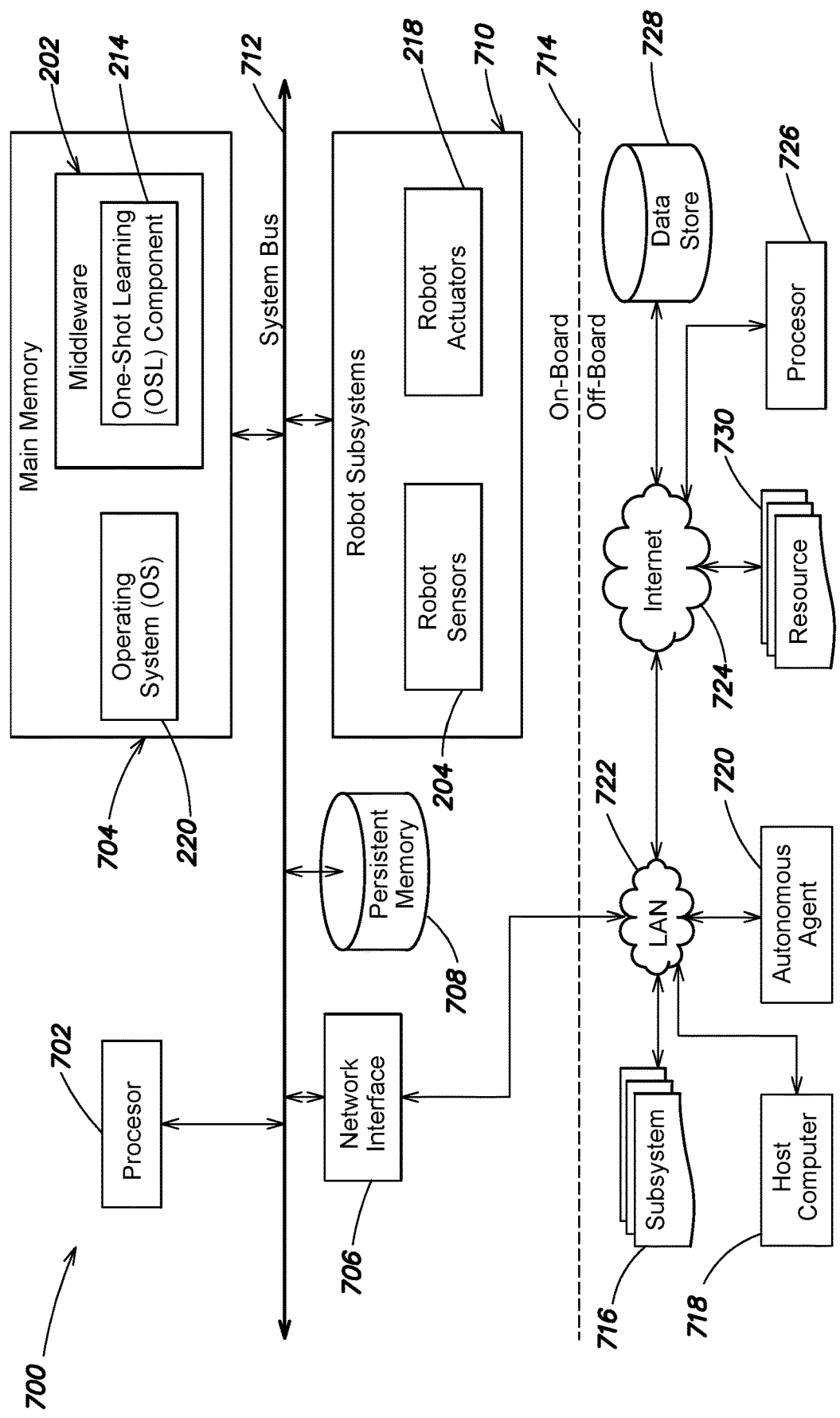
FIG. 7 is a schematic hardware illustration of an example autonomous robot agent in accordance with an embodiment of the disclosure.

FIG. 7 is a schematic illustration of a robot agent 700 in accordance with an embodiment. The robot agent 700 may include a processor 702, which may be a Central Processing Unit (CPU) or other processing logic, such as a microprocessor, a Field Programmable Gate Array (FPGA), an Application Specific Integrated Circuit (ASIC) or combinations thereof. The robot agent 700 may further include a main memory 704, which may store a plurality of programs, libraries or modules, such as the Operating System (OS)

220, and one or more applications running on top of the OS 220, such as the Middleware Layer 202, which includes the One-Shot Learning (OSL) component 214, among others. The robot agent 700 may also include a network interface card (NIC) 706, a persistent memory 708, and one or more robot subsystems, indicated at 710, which may include one or more of the robot sensors 204, and the robot actuators 218. The processor 702, main memory 704, NIC 706, persistent memory 708, and subsystems 710 may be interconnected by one or more busses, such as a system bus 712.

The processor 702, main memory 704, NIC 706, persistent memory 708, and robot subsystems 710 may be considered on-board elements as indicated by demarcating line 714.

The robot agent 700 may include or have access to one or more off-board elements. For example, the robot agent 700 may include or have access to other subsystems 716, a host computer 718 providing additional processing and/or memory resources, and an autonomous robot agent 720, providing additional processing, memory, and/or robot subsystems, through a Local Area Network (LAN) 722. In some embodiments, the robot agent 700 may include or have access to additional resources accessible through the Internet 724. For example, through Internet access, the robot agent 700 may access or include an additional processor 726, a data store 728, and other resources, designated generally at 730.

It should be understood that the robot agent 700 of FIG. 7 is meant for illustrative purposes only, and that the present disclosure may be used with intelligent systems having other architectures or designs.

Moreover, while learned scripts illustrated in this disclosure are expressed and stored in an XML-based format, this is meant to be illustrative of one possible knowledge representation format for expressing scripts. It should be understood that other text-based or binary formats for expressing and/or storing learned scripts may be used. In some embodiments, the formats used to express and/or store learned scripts systematically capture the constituent parts of the utterance semantics determined by the OSL component 214. Examples of other formats that may be used include the JavaScript Object Notation (JSON) data format, plain lists for use with programming languages, such as LISP and SCHEME, among others, and a custom format known by cohort members.

Virtual Agent

As described, the present disclosure may be implemented by a virtual agent. A virtual agent may include elements for recognizing natural language instructions and for generating speech, but may lack other subsystems for interacting with an environment. For example, a virtual agent may not include the Vision Processing Component 212, the mobile base subsystem 367, the arms, hand, torso subsystem 368, or the facial motors subsystem 369.

Despite lacking a physical body, a virtual agent can also be instructed in the same way a robot agent is instructed to acquire new knowledge in one-shot, for example, in the case of instructing a virtual agent about how a human instructor wants to search for a flight ("To search for a flight, open www.favoritetravelsite.com in a web browser, select flight search, and enter the flight data, then forward the result to my email address"). As part of the instruction, the virtual agent might ask about what "flight data" meant, and the human instructor may then explain that the flight data included dates, airports at the origin and destination, etc.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system or a human user of a computer or data processing system, unless otherwise stated.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. For example, while the callable units may typically include all initialize, reset, and terminate operations included in a model, in some implementations one or more of the initialize, reset, and/or terminate operations may be omitted from the respective callable units. Therefore, it is the object of the appended claims to cover all such variations and modifications as come within the true spirit and scope of the disclosure.

What is claimed is:

1. A method comprising:
receiving, at an intelligent system, a first instruction for augmenting a knowledge representation of said system with knowledge involving an object in an environment, the instruction
provided by a human instructor in a natural language format, and
representing knowledge related to at least one of an event, an object relation, a rule, an action, or a goal,
wherein the intelligent system includes one or more subsystems for sensing the environment and for interacting with the object;
generating, by the intelligent system, an in-memory representation of a meaning of the instruction;
dividing, by the intelligent system, the in-memory representation of the meaning of the instruction into elements based on predefined knowledge types, where the elements correspond to parts of the in-memory representation of the meaning of the instruction;

assigning to the elements of the in-memory representation of the instruction respective ones of the predefined knowledge types;

generating, by the intelligent system, one or more executable scripts that encode the at least one of the event, the object relation, the rule, the action, or the goal, where the one or more executable scripts control the one or more subsystems of the intelligent system to operate within the environment in order to interact with the object to perform a task, the generating the one or more executable scripts including creating at least one of an object specification, an event specification, an object relation specification, an action specification, a rule specification, or a goal specification, based on the assignment of the respective ones of the predefined knowledge types to the elements of the in-memory representation of the instruction, and incorporating the at least one of the object specification, the event specification, the object relation specification, the action specification, the rule specification, or the goal specification into the one or more executable scripts;

augmenting the knowledge representation of the intelligent system with knowledge comprising the one or more executable scripts; and executing, by the intelligent system, the one or more executable scripts, where the executing includes controlling the one or more subsystems of the intelligent system to interact with the object in accordance with a second instruction, where the generating the in-memory representation of the meaning of the instruction, the dividing, the assigning, the generating the one or more executable scripts, and the executing steps are performed while the intelligent system is on-line.

2. The method of claim 1 wherein the predefined knowledge types include at least one of an object type, an object relationship type, a procedure type, an event type, a rule type, or a goal type.

3. The method of claim 1 further comprising:
evaluating, by the intelligent system, the elements of the in-memory representation of the second instruction;
based on the evaluating, determining that a first element of the elements is unknown to the intelligent system;
generating, by the intelligent system, a query to obtain information on the first element;
presenting the query to the human instructor;
receiving, at the intelligent system the first instruction from the human instructor; and based on the response from the human instruction, augmenting the knowledge representation, by the intelligent system, with knowledge related to the first element.

4. The method of claim 1 further comprising:
identifying, by the intelligent system, a context associated with the first instruction provided by the human instructor; and
utilizing the context to generate the one or more executable scripts.

5. The method of claim 1 wherein the first instruction provided by the human instructor includes a deictic reference, the method further comprising:
resolving, by the intelligent system, the deictic reference included in the instruction in terms of one or more of the predefined knowledge types.

6. The method of claim 1 wherein the intelligent system is an autonomous robot agent, and the subsystems include at least one of a vision subsystem, a gripper subsystem, or a sound recording subsystem.

7. The method of claim 1 further comprising:
transmitting, by the intelligent system, one or more of the elements of the in-memory representation of the instruction or the one or more executable scripts from the intelligent system to a cohort agent.

8. The method of claim 1 wherein the first instruction is provided by the human instructor in a single encounter with the intelligent system.

9. The method of claim 1 wherein the first instruction from the human instructor is provided at least in part through verbal instructions.

10. The method of claim 1 wherein the first instruction is received from one or more files, or an instructional video.

11. The method of claim 1 further comprising:
automatically generalizing the one or more executable scripts to a general object, based on a type of variable used in a definition of the object.

12. The method of claim 1 wherein the object is a physical object and the environment is a physical environment.

13. The method of claim 1 wherein the object is a virtual object and the environment is a virtual environment.

14. The method of claim 1 wherein the intelligent system is an autonomous robot or a virtual agent.

15. An intelligent system comprising:
an electronic memory for storing a knowledge representation and storing a first instruction for augmenting the knowledge representation with knowledge involving an object in an environment, the instruction
provided by a human instructor in a natural language format, and
representing knowledge related to at least one of an event, an object relation, a rule,
an action, or a goal;
one or more subsystems; and
one or more processors coupled to the electronic memory and the one or more subsystems, the one or more processors configured to:
generate an in-memory representation of a meaning of the instruction;
divide the in-memory representation of the meaning of the instruction into elements based on predefined knowledge types, where the elements correspond to parts of the in-memory representation of the meaning of the instruction;
assign to the elements of the in-memory representation of the instruction respective ones of the predefined knowledge types;
generate one or more executable scripts that encode the at least one of the event, the object relation, the rule, the action, or the goal, where the one or more executable scripts control the one or more subsystems to operate within the environment in order to interact with the object to perform a task, the generate the one or more executable scripts including
creating at least one of an object specification, an event specification, an object relations specification, an action specification, a rule specification, or a goal specification, based on the assignment of the respective ones of the predefined knowledge types to the elements of the in-memory representation of the instruction, and
incorporating the at least one of the object specification, the event specification, the object relation specification, the action specification, the rule specification, or the goal specification into the one or more executable scripts; and augmenting the knowledge representation with knowledge comprising the one or more executable scripts, where the generate the in-memory representation of the meaning of the instruction, the divide, the assign, the generate the one or more executable scripts, and the execute steps are performed while the intelligent system is on-line.

16. The intelligent system of claim 15 wherein the pre-defined knowledge types include at least one of an object type, an object relationship type, a procedure type, an event type, a rule type, or a goal type.

17. The intelligent system of claim 15 wherein the sub-systems include at least one of a vision subsystem, a gripper subsystem, or a sound recording subsystem.

18. The intelligent system of claim 15 wherein the object is a physical object and the environment is a physical environment.

19. The intelligent system of claim 15 wherein the first instruction is provided by the human instructor in a single encounter with the intelligent system.

20. A method for operating a robotic system comprising:
receiving instructions for the robotic system via a natural language interface, including receiving task instructions including a first task instruction; and
interpreting the task instructions accord to data stored in a knowledge repository to form respective operational scripts for controlling the robotic system according to said task instructions, the knowledge repository comprising data representations of knowledge elements, the knowledge elements relating to at least one of events, objects, relationships between objects, actions, and goals, and wherein interpreting the task instructions includes interpreting of the first task instruction by forming an in-memory representation of said instruction according to knowledge elements of the knowledge repository in a first state of said repository, and generating a first script for task the robotic system according to the in-memory representation of the first task instruction;
wherein receiving the instructions for the robotic system further includes receiving one or more teaching instructions during operation of the robotic system, including receiving a first teaching instruction; and
wherein the method further comprises:
interpreting the first teaching instruction, including forming an in-memory representation of elements of the first teaching instruction, one or more of the elements of the teaching instruction corresponding to knowledge elements of the knowledge repository in the first state of said repository;
wherein the interpreting of the first teaching instruction further comprises forming a new knowledge element from the in-memory representation, the new knowledge element representing at least one of an events, object, relationships between objects, actions, rules, and goal represented in terms of one or more knowledge elements of the knowledge repository in the first state of said repository;
augmenting the knowledge repository with a data representation of the new knowledge element forming a second state of the knowledge repository;
wherein receiving the task instructions includes receiving a second task instruction after augmenting the knowledge representation to the second state of said repository; and
wherein interpreting the task instructions further comprises interpreting of the second task instruction by forming an in-memory representation of the second task instruction according to knowledge elements of the knowledge repository in the second state of said repository including according to the new knowledge element formed from the first teaching instruction, and generating a second script for operating the robotic system according to the in-memory representation of the second task instruction.

21. The method of claim 20, wherein augmenting the knowledge repository with the data representation comprises storing the data representation in a permanent storage.

22. The method of claim 20, wherein receiving the task instructions includes receiving a third instruction prior to augmenting the knowledge representation to the second state of said repository; and
wherein interpreting the third instruction includes forming an in-memory representation of elements of the third instruction, and determining that at least one element of said elements is not represented in the knowledge representation in the first state; and
wherein the method further comprises presenting a first query for requesting augmentation of the knowledge repository based on the at least one element of the representation of the third instruction; and
wherein the receiving of the first teaching instruction is in response to the presenting of the first query.

* * * * *